(12) United States Patent
Pelletier

(10) Patent No.: US 8,864,413 B2
(45) Date of Patent: Oct. 21, 2014

(54) GAS AND LIQUID EXTRACTION SYSTEM AND METHOD

(76) Inventor: Marc-Antoine Pelletier, Georgeville (CA)

( * ) Notice: Subject to any disclaimer, the term of this patent is extended or adjusted under 35 U.S.C. 154(b) by 430 days.

(21) Appl. No.: 12/735,698

(22) PCT Filed: Feb. 11, 2009

(86) PCT No.: PCT/CA2009/000168
§ 371 (c)(1), (2), (4) Date: Nov. 15, 2010

(87) PCT Pub. No.: WO2009/100529
PCT Pub. Date: Aug. 20, 2009

(65) Prior Publication Data
US 2011/0058901 A1   Mar. 10, 2011

Related U.S. Application Data

(60) Provisional application No. 61/064,025, filed on Feb. 11, 2008.

(51) Int. Cl.
*B09B 1/00*   (2006.01)
*B09B 3/00*   (2006.01)
*E02D 31/00*   (2006.01)

(52) U.S. Cl.
CPC .. *B09B 1/00* (2013.01); *B09B 1/006* (2013.01)
USPC .............. 405/129.95; 405/129.2; 405/129.57; 405/129.7; 405/129.85

(58) Field of Classification Search
CPC .......... B09B 1/00; B09B 1/004; B09B 1/006; B09B 3/0016; E02B 11/005; B09C 1/005; B09C 1/02

USPC .............. 405/129.95, 129.7, 129.85, 129.57, 405/129.2; 137/177–196, 613, 614, 137/614.01–614.06, 614.11–614.21
See application file for complete search history.

(56) References Cited

U.S. PATENT DOCUMENTS 1,452,778 A * 4/1923 Barbet .............................. 95/19
1,544,024 A * 6/1925 Moeller et al. ................ 137/587

(Continued)

FOREIGN PATENT DOCUMENTS

DE   10 2005 008 243 A1   8/2006

OTHER PUBLICATIONS

Cointreau, Sandra. Sanitary Landfill Design and Siting Criteria. May 1996. Link: http://siteresources.worldbank.org/INTUSWM/Resources/463617-1202332338898/landfillsitingdesign.pdf.*

(Continued)

*Primary Examiner* — John Kreck
*Assistant Examiner* — Edwin Toledo-Duran
(74) *Attorney, Agent, or Firm* — Muirhead and Saturnelli, LLC

(57) ABSTRACT

A gas and liquid extraction system and method to efficiently capture the gas generated from the decomposition of organic matter, generally referred herein as the biomass, present in a landfill is disclosed herein. The system and method taking in account the presence of high amount of water and proposing landfilling methodology to allow the efficient capture of an as high as possible amount of gas from each and every ton of biomass contained in the landfill which is heterogeneous, anisotropic in nature and unsteady in term of fluid flow behavior.

14 Claims, 21 Drawing Sheets

(56) References Cited

U.S. PATENT DOCUMENTS

| | | | | |
|---|---|---|---|---|
| 3,586,624 A * | 6/1971 | Larson | ................ | 210/747.7 |
| 4,026,355 A * | 5/1977 | Johnson et al. | ................ | 166/246 |
| 4,195,524 A * | 4/1980 | Hansen | ................ | 73/863.11 |
| 4,248,548 A * | 2/1981 | Danford | ................ | 405/129.6 |
| 4,442,901 A * | 4/1984 | Zison | ................ | 166/369 |
| 4,464,081 A * | 8/1984 | Hillier et al. | ................ | 588/259 |
| 4,469,176 A * | 9/1984 | Zison et al. | ................ | 166/369 |
| 4,483,641 A * | 11/1984 | Stoll | ................ | 588/249 |
| 4,670,148 A * | 6/1987 | Schneider | ................ | 210/603 |
| 4,678,582 A * | 7/1987 | Lavigne | ................ | 210/150 |
| 4,859,116 A * | 8/1989 | Harris | ................ | 405/52 |
| 4,946,310 A | 8/1990 | Wunderatzke | | |
| 4,973,195 A * | 11/1990 | Sweeney et al. | ................ | 405/129.57 |
| 5,066,166 A * | 11/1991 | Hansen | ................ | 405/128.6 |
| 5,092,709 A * | 3/1992 | Davis | ................ | 405/129.7 |
| 5,857,807 A * | 1/1999 | Longo, Sr. | ................ | 405/129.7 |
| 6,102,617 A * | 8/2000 | Hampton | ................ | 405/52 |
| 6,193,893 B1 * | 2/2001 | Mazzei et al. | ................ | 210/702 |
| 6,283,676 B1 * | 9/2001 | Hater et al. | ................ | 405/129.57 |
| 6,481,929 B1 * | 11/2002 | Layton et al. | ................ | 405/129.95 |
| 6,497,533 B2 * | 12/2002 | DeGarie | ................ | 405/52 |
| 6,881,010 B2 * | 4/2005 | Cash | ................ | 405/129.57 |
| 6,929,423 B2 * | 8/2005 | Kittle | ................ | 405/129.95 |
| 7,118,308 B2 * | 10/2006 | Hater et al. | ................ | 405/129.95 |
| 7,347,648 B2 * | 3/2008 | Subbarayan et al. | ................ | 405/129.95 |
| 7,357,601 B2 * | 4/2008 | Howard | ................ | 405/129.5 |
| 7,422,393 B2 * | 9/2008 | Schwalbe | ................ | 405/129.95 |
| 7,448,828 B2 * | 11/2008 | Augenstein et al. | ................ | 405/129.95 |
| 7,537,415 B2 * | 5/2009 | Khire | ................ | 405/129.95 |
| 7,628,567 B2 * | 12/2009 | Khire | ................ | 405/129.95 |
| 7,704,014 B2 * | 4/2010 | Steenbakkers et al. | ................ | 405/128.1 |
| 2002/0174977 A1 * | 11/2002 | Low et al. | ................ | 165/157 |
| 2005/0111918 A1 * | 5/2005 | Yeager | ................ | 405/129.85 |
| 2005/0236042 A1 * | 10/2005 | Hansen et al. | ................ | 137/236.1 |
| 2006/0029473 A1 * | 2/2006 | Khire | ................ | 405/129.2 |
| 2007/0189856 A1 * | 8/2007 | Schwalbe | ................ | 405/129.95 |

OTHER PUBLICATIONS

Waste Management. Anatomy of a Landfill. May 20, 2007. Link: http://web.archive.org/web/20070520003641/http://newmexico.wm.com/landfills/index.html.*

* cited by examiner

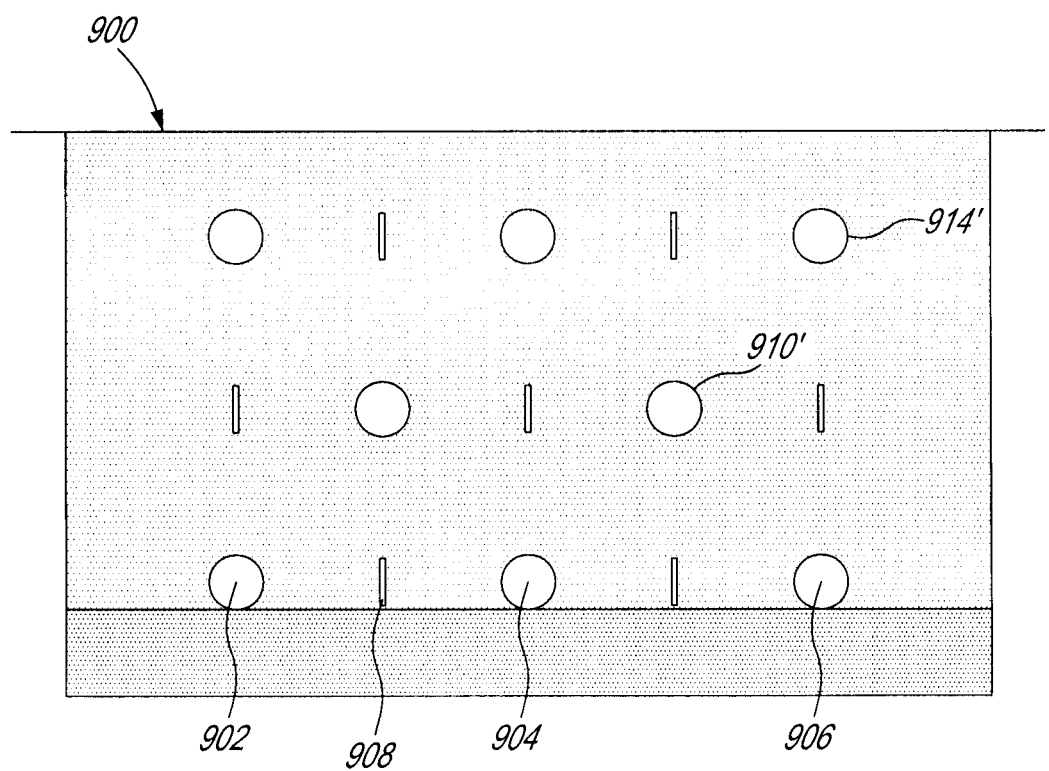

GAS AND LIQUID EXTRACTION SYSTEM AND METHOD

RELATED APPLICATIONS

This application claims priority to U.S. Provisional App. No. 61/064,025, filed Feb. 11, 2008.

FIELD

The present invention generally relates to gas and liquid extraction. More specifically, embodiments of the present invention are concerned with systems and methods to extract gas produced from anaerobic decomposition of organic matter and with systems and methods to extract liquid occurring from rain water, water content in organic matter and condensate.

BACKGROUND

The generation of gas produced from the anaerobic decomposition of organic matter is a natural process occurring all around the world.

In recent decades the organic matter generated as by-product of human activities has been stored in large cells usually confined with under and overlaying membranes. The overlaying membrane could be described as daily cover and final cover.

The organic matter thus trapped is slowly drying since no more rainfall precipitations can penetrate the impermeable body of organic matter. Even during the drying period, the organic matter can produce gas as a by-product of anaerobic decomposition, but to a limited extend and for a limited period of time, because such decomposition requires water to occur.

The microbiological cycle of gas production requires as high moisture and temperature as possible to activate and accelerate the microbiological decomposition of the organic matter under anaerobic conditions.

Before this discovery, it was found that the artificial introduction of water into the biomass of a landfill, even trough it includes impermeable membranes at the bottom and at the top, improves the amount and duration of gas production from organic matter. This was generally called bioreactor landfill system.

However, the presence of standstill water below the surface level of the biomass of a landfill generally prevents the efficient capture of landfill gas using vertical wells. Therefore, the efficient extraction of liquid present in the biomass and of gas generated from the decomposition of the organic matter using conventional methods is more difficult.

It has also been observed that the internal pressure profile varies in the landfill following cycles of high and low positive pressure generating a pressure wave over time which has varying amplitude and a varying frequency.

The pressure wave frequency and amplitude varies according to internal properties of the body of waste such as waste type, waste density, waste moisture content, waste porosity, waste layering, and the waste age. Because these properties of waste layers and composition are not constant within the body of the landfill it creates anisotropic and heterogeneous conditions. These inherent conditions coupled with landfill internal variation of temperature, moisture content, organic matter content and waste distance from the atmosphere cause the pressure wave amplitude and frequency, at a given point, to be unsteady over time. This means that any pressure wave amplitude and frequency is difficult to predict.

However, observations are showing that:

Pressure wave formation is essentially caused by a sequence of pressure build-up in the landfill due to organic matter decomposition followed by pressure release towards the atmosphere (the zone of lowest positive pressure) through micro and/or macropores creating pathways to ensure that the landfill gas escape towards the atmosphere, whether located upwards or sideways.

Younger waste with a combination of high temperature, high organic matter content, high moisture content under a predetermined waste density, depth and porosity will have a high pressure wave frequency (see FIG. 1).

Older waste with a combination of low temperature, low organic matter content, low moisture content under a predetermined waste density, depth and porosity will have a low pressure wave frequency (see FIG. 2).

Older waste may also have lower amplitude than the amplitude of younger waste because of lower pressure built-up caused by preferential path created over time within the network of micro and macro pores towards the atmosphere (see FIG. 3).

Also, at a predetermined waste density, depth and porosity, the absence or depletion of moisture, temperature, organic content or a combination thereof will create low frequency/low amplitude pressure wave and indicate a reduction in landfill gas flow rate potential.

BRIEF DESCRIPTION OF THE DRAWINGS

In the appended drawings:

FIG. 27 schematically illustrates, in a cross-section view, a landfill provided with three rows of wells disposed in an alternate configuration.

DETAILED DESCRIPTION

Figure 1:
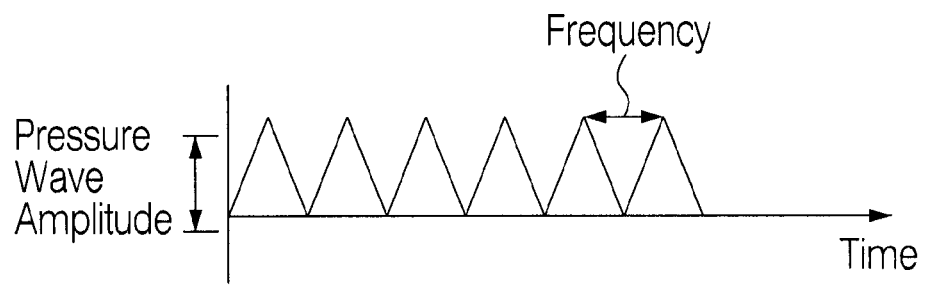
FIG. 1 is a schematic representation of the pressure wave amplitude and frequency over time for young waste.
Figure 2:
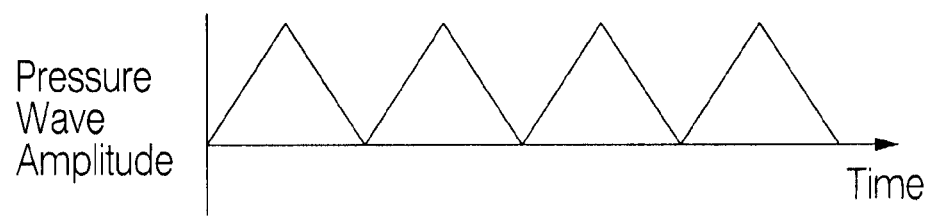
FIG. 2 is a schematic representation of the pressure wave amplitude and frequency over time for old waste.
Figure 3:
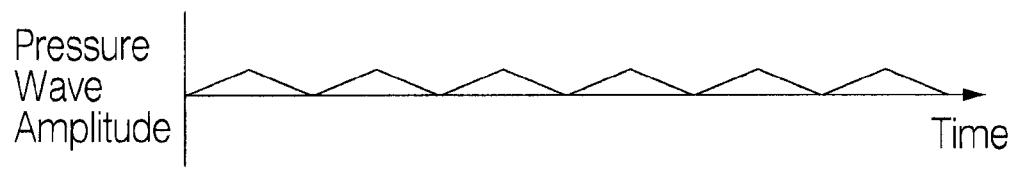
FIG. 3 is a schematic representation of the pressure wave amplitude and frequency over time for old waste having low amplitude.

In accordance with an illustrative embodiment, there is provided a gas and liquid extraction system to be installed in a landfill to extract gas and liquid from the biomass present in the landfill; the extraction system comprising:

a perforated well so positioned in the biomass as to have a downward slope;

a pipeline connected to the perforated well and having a downward slope; the pipeline including a liquid extraction mechanism to extract liquid from the sloping pipeline;

a vacuum source connected to the pipeline to selectively apply a vacuum to the pipeline and to the attached perforated well to extract gas from the sloping pipeline.

In accordance to another aspect, there is provided a gas and liquid extraction system to be installed in a landfill to extract gas and liquid from the biomass present in the landfill; the extraction system comprising:

a plurality of perforated wells so positioned in the biomass as to have a downward slope;

a vacuum source;

a pipeline system interconnecting the plurality of perforated wells to the vacuum source via individual actuating valves; the pipeline system having a downward slope and including a liquid extraction mechanism to extract liquid from the sloping pipeline;

a sensing device provided in the vicinity of a perforated well;

a receiver-controller so configured as to control the actuation of the valves and to receive data from the sensing device;

wherein the receiver-controller determines the actuation of the valves depending on the data received from the sensing device.

In accordance to another aspect, there is provided a gas and liquid extraction method to extract gas and liquid from a biomass provided in a landfill; the extraction method comprising:

installing a perforated well on the upper part of a first biomass layer; the perforated well being so installed as to have a downward slope;

providing a second biomass layer on top of the first biomass layer;

connecting the perforated well to a vacuum source via a pipeline including a liquid extraction mechanism;

selectively applying a vacuum to the perforated well to extract gas from the biomass; and extracting liquid from the pipeline.

In accordance to another aspect, there is provided a gas and liquid extraction method to extract gas and liquid from a biomass provided in a landfill; the extraction method comprising:

installing a first perforated well on the upper part of a first biomass layer; the first perforated well being so installed as to have a downward slope;

providing a second biomass layer adjacent to of the first biomass layer;

connecting the first perforated well to a vacuum source via a first pipeline including a liquid extraction mechanism;

selectively applying a vacuum to the first perforated well to extract gas from the biomass;

extracting liquid from the first pipeline;

when the second biomass layer reaches a predetermined size:

installing a supplemental perforated well adjacent to the first perforated well;

providing a third biomass layer adjacent to the second biomass layer;

connecting the supplemental perforated well to the vacuum source via a supplemental pipeline;

selectively applying a vacuum to the supplemental perforated well to extract gas from the biomass; and extracting liquid from the supplemental pipeline.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "perforated well" is to be construed herein and in the appended claims as any tubular member configured to allow gas and liquid through its surface.

It is to be noted that the expression "adjacent well" is to be construed herein and in the appended claims as a well that is spaced apart from another well, either horizontally, vertically or diagonally.

It is to be noted that the expression "adjacent well" is to be construed herein and in the appended claims as a well that has a distance from another well that could vary according to landfill characteristics.

Similarly, the term "adjacent" when used in conjunction with the terms "biomass" or "biomass layer" is to be construed herein and in the appended claims as meaning being horizontally, vertically or diagonally adjacent.

It is also to be noted that the expressions "negative pressure", "depression" and "vacuum" are used interchangeably in the present disclosure.

Other objects, advantages and features of the present invention will become more apparent upon reading of the following non-restrictive description of illustrative embodiments thereof, given by way of example only with reference to the accompanying drawings.

Generally stated, illustrative embodiments disclose a gas and liquid extraction system to efficiently capture the gas generated from the decomposition of organic matter, generally referred herein as the biomass, present in a landfill; taking in account the presence of high amount of water and proposing landfilling methodology to allow the efficient capture of an as high as possible amount of gas from each and every ton of biomass contained in the landfill.

Horizontal Well Technology

Figure 4:
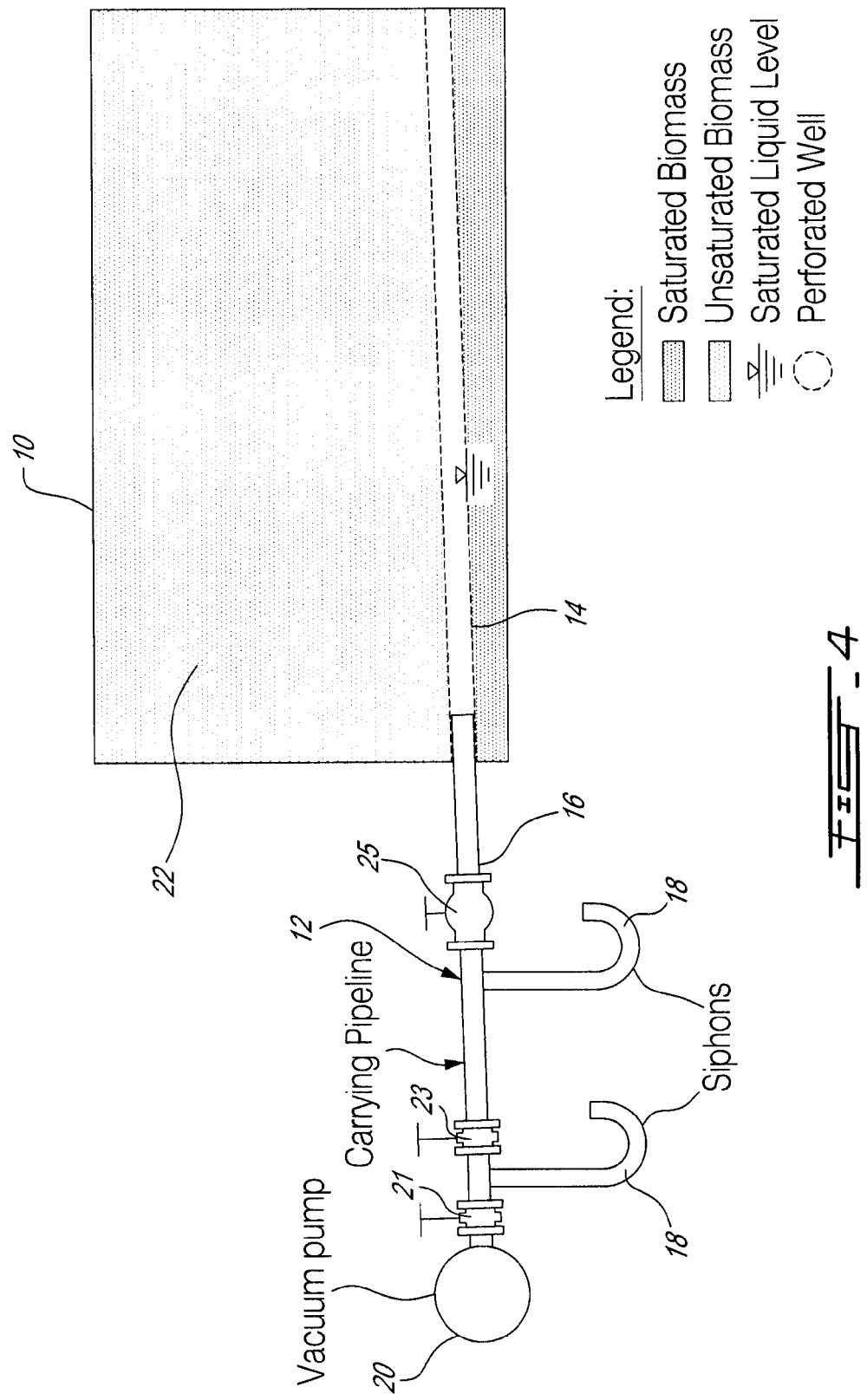
FIG. 4 is a side elevation view of a landfill provided with a gas extraction system according to a first illustrative embodiment.

FIG. 4 of the appended drawings illustrates a landfill 10 provided with a gas and liquid extraction system 12 according to a first illustrative embodiment.

The gas and liquid extraction system 12 includes a gently sloping perforated well 14 connected to a pipeline 16, a liquid extraction mechanism in the form of two inverted siphons 18, a vacuum pump 20 connected to the pipeline 16 via a main valve 21 located downstream of the siphons 18. A manifold gas valve 23 is provided between the two siphons 18 and a leachate & gas valve 25 is provided between the landfill 10 and the siphons 18.

Since liquid can enter the gently sloping perforated well 14 and be evacuated via the siphons 18 as will be described hereinbelow, the biomass located above the well 14 is an unsaturated biomass 22, while the biomass located below the well 14 is a saturated biomass.

As a non-limiting example, the gently sloping perforated well 14 can be a 10 inches (about 25 cm) generally cylindrical hollow tube provided with perforations and so installed in the biomass as to present a slope of about 2 degrees. Optionally, the perforated well 14 can be surrounded by porous drainable material to increase the nominal diameter of the perforated well 14.

Figure 5:
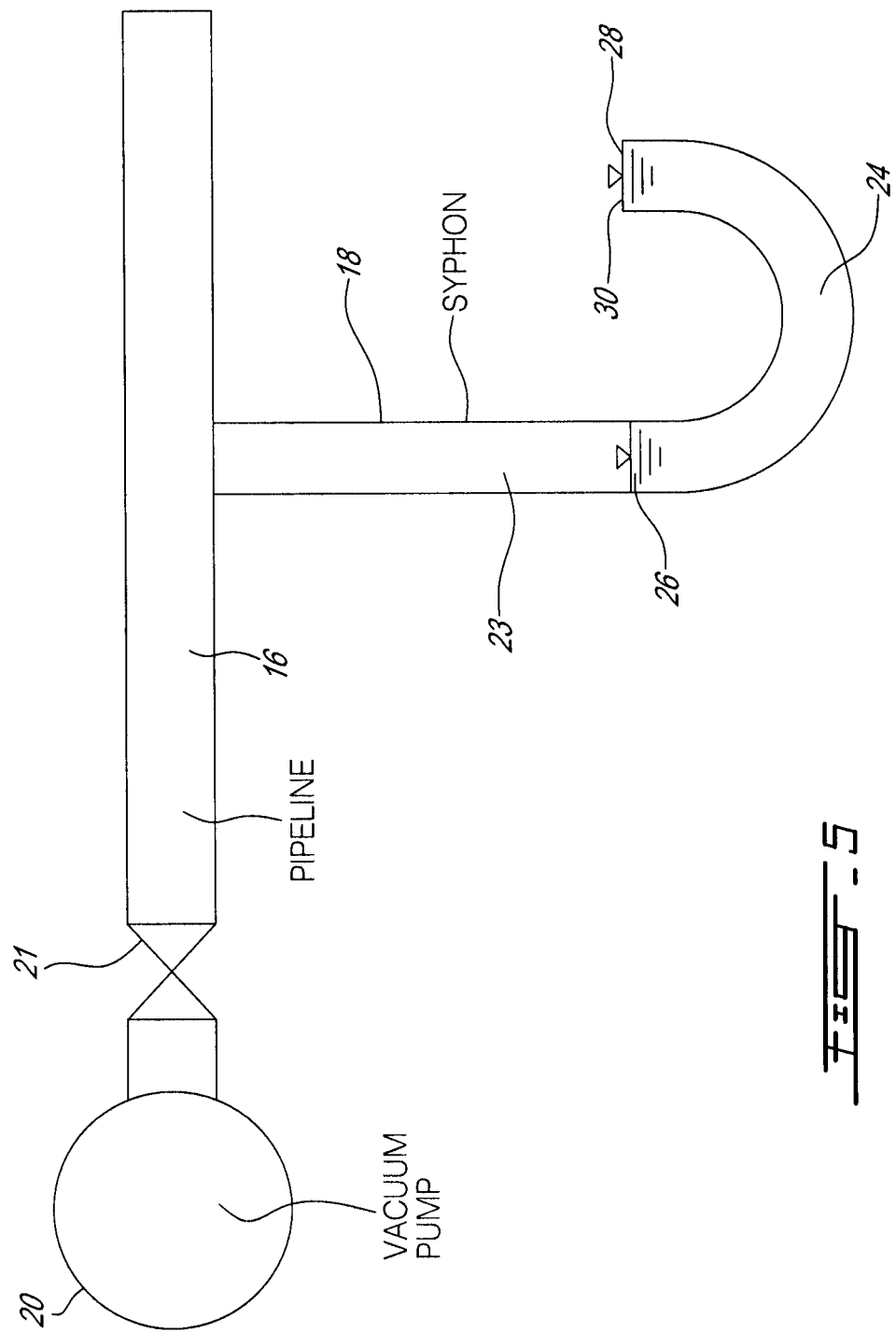
FIG. 5 is a sectional view of an inverted siphon connected to a pipeline, as used in the system of FIG. 4; the vacuum pump being non-energized.

Turning now to FIG. 5, one of the inverted siphons 18 is illustrated. The siphon 18 is a J-shaped tube including a downward straight portion 23 and an integral curved portion 24. As is generally known, the liquid level 26 in the straight portion 23 is the same as the level 28 of the free open end 30 of the siphon 18. It is to be noted that the vacuum pump 20 is not operational.

Figure 6:
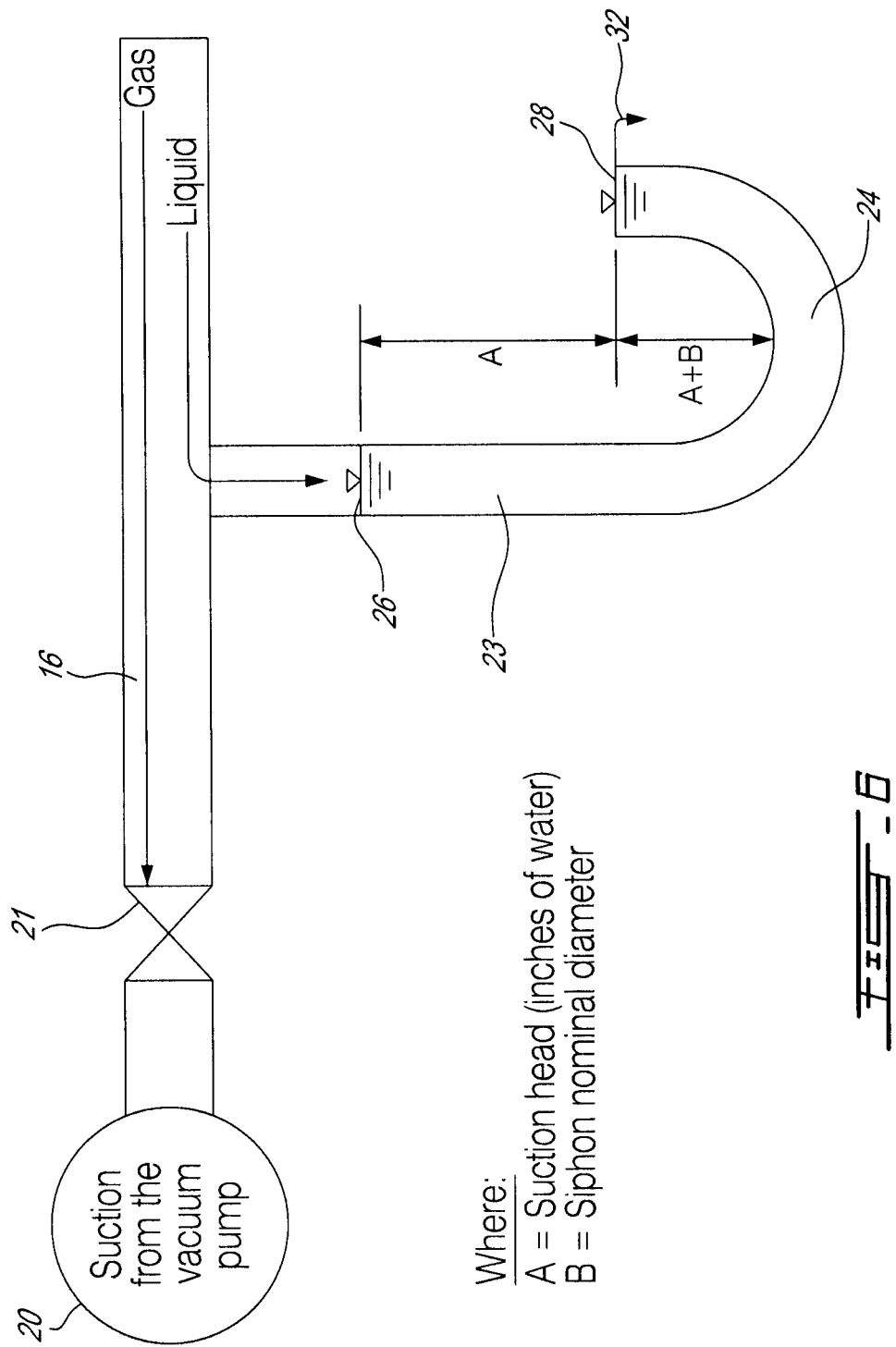
FIG. 6 is a sectional view of the inverted siphon of FIG. 5 when the vacuum pump is energized.

FIG. 6 illustrates the siphon 18 of FIG. 5 when the vacuum pump 20 is energized carrying both gas and liquid from the landfill. When this is the case, the liquid level 26 in the straight portion 23 is raised by the addition of liquid from the pipeline 16 and by the vacuum created in the pipeline 16. Additional increase of the liquid level 26 forces the liquid from the integral curved portion to exit the siphon 18 by the open end 30 (see arrow 32). The leachate is therefore discharged from the siphon by gravity.

In operation, the vacuum pump 20 creates a vacuum in the pipeline 16 to therefore draw the gas produced in the landfill through the gently sloping perforated well 14 and the pipeline 16. This gas may then be supplied to a system that either destroys or transforms the gas into heat and/or power. These destruction and transformation systems are believed known to those skilled in the art and will therefore not be discussed in details herein.

The liquid present in the landfill 10 above the perforated well 14, is evacuated through the perforated well 14, the pipeline 16 and the inverted siphons 18 under the influence of the gravity and of the suction generated by the vacuum pump 20 to thereby leave an unsaturated biomass above the level of the perforated well 14.

The liquid and gas getting in the pipeline 16 via the perforated well 14 are therefore separated by the combined action of the siphons 18 and the vacuum pump 20.

A main valve 21 is installed on the pipeline 16, usually downstream from the last siphon 18. This valve 21 isolates the landfill gas and liquid from the vacuum pump. Valve 21 is opened only to create a depression on the perforated well 14 for gas and liquid to escape more rapidly from the landfill. Under passive conditions, valve 21 and 23 are closed leaving valve 25 to drain out the excess water from the landfill through the siphon. Once it is decided to extract gas from the landfill, valves 21 and 23 are fully opened and valve 25 slowly primes the pipeline 16 with the suction applied by the vacuum pump 20 and regulates the flow of gas in the pipeline 16. The priming is usually done at the beginning of the gas extraction, when the perforated well 14 and the pipeline 16 will carry additional liquid being trapped in the surroundings of the well 14. During the priming, the pipeline 16 may flow full of liquid for a time to empty the surrounding area of the perforated well over the whole longitudinal distance of the perforated well and for lateral distances that can vary depending on the hydraulic conductivity of the porous mass. The priming is generally done slowly and carefully since the vacuum applied by the vacuum pump to the siphon 18 increases the speed of the fluid in the pipeline 16 and may cause fluid to bypass the siphons and travel to the vacuum pump, which may damage the pump. A second siphon is usually installed to overcome the first siphon by-pass.

Of course, one skilled in the art will understand that the number of inverted siphons 18 could vary depending on the configuration and size of the landfill.

It will be understood that the use of a generally horizontally laid perforated well 14 used in illustrative embodiments is interesting since the horizontal well has a greater contact surface with the saturated biomass leading to a more efficient liquid extraction and also a greater contact with the unsaturated biomass, leading to a more efficient gas extraction.

An example of a method used to install the gas and liquid extraction system 12 in the landfill 10 will now be described.

The gently sloping perforated well 14 is laid out when a thickness of about 3 to about 5 meters of waste biomass material has been placed in the landfill 10. The well 14 is then buried with waste material to allow the gas and liquid extraction system 12 to be started.

In other words, a perforated well is installed on the upper part of a first biomass layer and a second biomass layer is provided on top of the perforated well.

Figure 7:
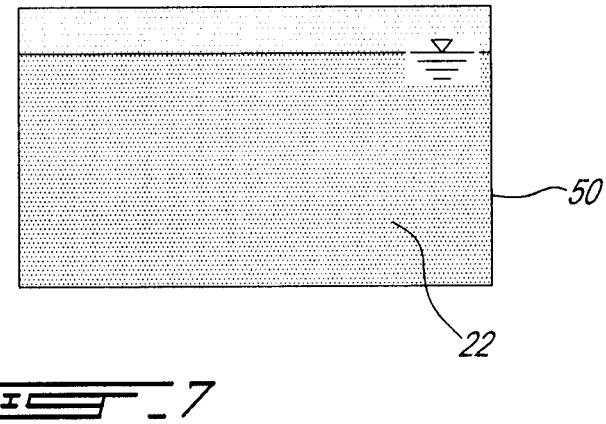
FIG. 7 illustrates a landfill without a fluid drainage pipe.
Figure 8:
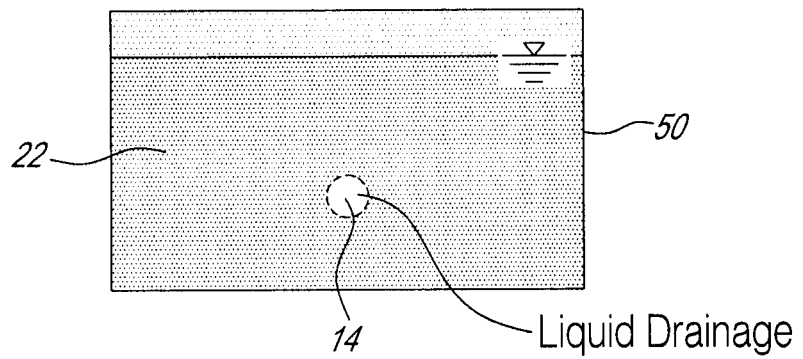
FIG. 8 illustrates a fluid drainage pipe inserted in the landfill of FIG. 7.
Figure 9:
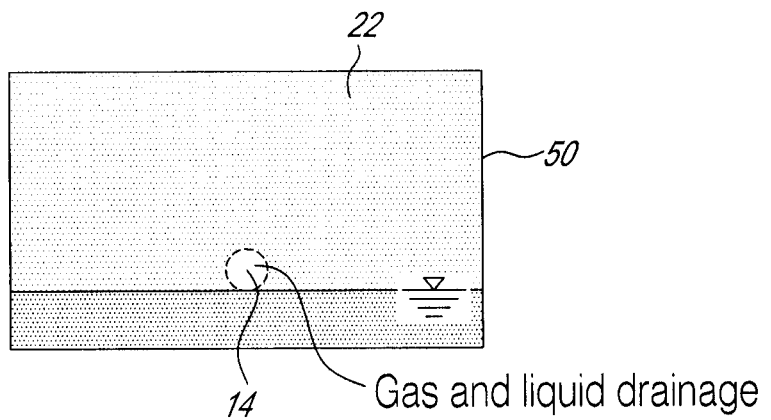
FIG. 9 illustrates the result of the drainage of the fluid from the landfill.

FIGS. 7 to 9 are front elevational views illustrating the introduction of a perforated well 14 in a liquid saturated landfill 50. More specifically, FIG. 7 illustrates the landfill 50 before the introduction of the well 14. FIG. 8 illustrates the landfill 50 when the well 14 is introduced. The introduction of the well 14 triggers the drainage of the liquid out of the biomass 22, i.e. the organic biomass waste material, done during the priming of the well and gradually lowers the level of the liquid saturated biomass. FIG. 9 illustrates the landfill 50 after the well 14 has been introduced for an adequate time. The adequate time is at least partially determined by the natural hydraulic conductivity of the porous biomass.

It is to be noted that any liquid that flows in the biomass, for example rainfall precipitations or liquid present in the additional biomass put on top of the existing drained biomass, is drained out with the gaseous fluid and separated by the siphons as described hereinabove.

It is also to be noted that should the vacuum be stopped in a well for a sufficiently long time, it might be necessary to re-prime the well as discussed above.

It is believed that one skilled in the art will be in a position to determine the level of vacuum applied to the carrying pipeline 16 by the vacuum pump 20. The following considerations may be taken for the determination of the vacuum level:

- The vacuum level of the vacuum pump should compensate for the friction head losses in the pipeline;
- The nominal vacuum level at the entry of the well should be higher than about five time the average pressure found in the landfill to compensate for the friction head losses in the porous biomass matrix; and
- The nominal vacuum level at the entry of the well is set according to the naturally occurring pressure variations at the depth of the well.

The following features are believed interesting in the gas and liquid extraction system described hereinabove:

- The length of the straight portion of the siphons is determined by the suction applied to the pipeline by the vacuum pump;
- Since the curved portion of the siphons is filled with liquid, no outside gas is introduced in the pipeline;
- The oxygen level should not exceed about 1% in volume; the oxygen level is an indication of aerobic metabolic conversion of biomass or the presence of preferential flow paths from the atmosphere to the well; in both cases the presence of oxygen when detected causes a reduction in the methane fraction of the landfill gas
- The pipeline should not have humps or slumps that exceed the nominal pipeline diameter to allow liquid flow by gravity;
- The diameter of the tube of the siphons shall be greater than or about the same than the nominal diameter of the pipeline;
- The well, illustrated herein as a perforated pipe, could be replaced by any element acting as a drainage conduit for the liquid and gas, connected to an external pipeline; and
- The siphon also extracts any liquid condensate that may be produced as the gas flows in the pipeline.

Figure 10:
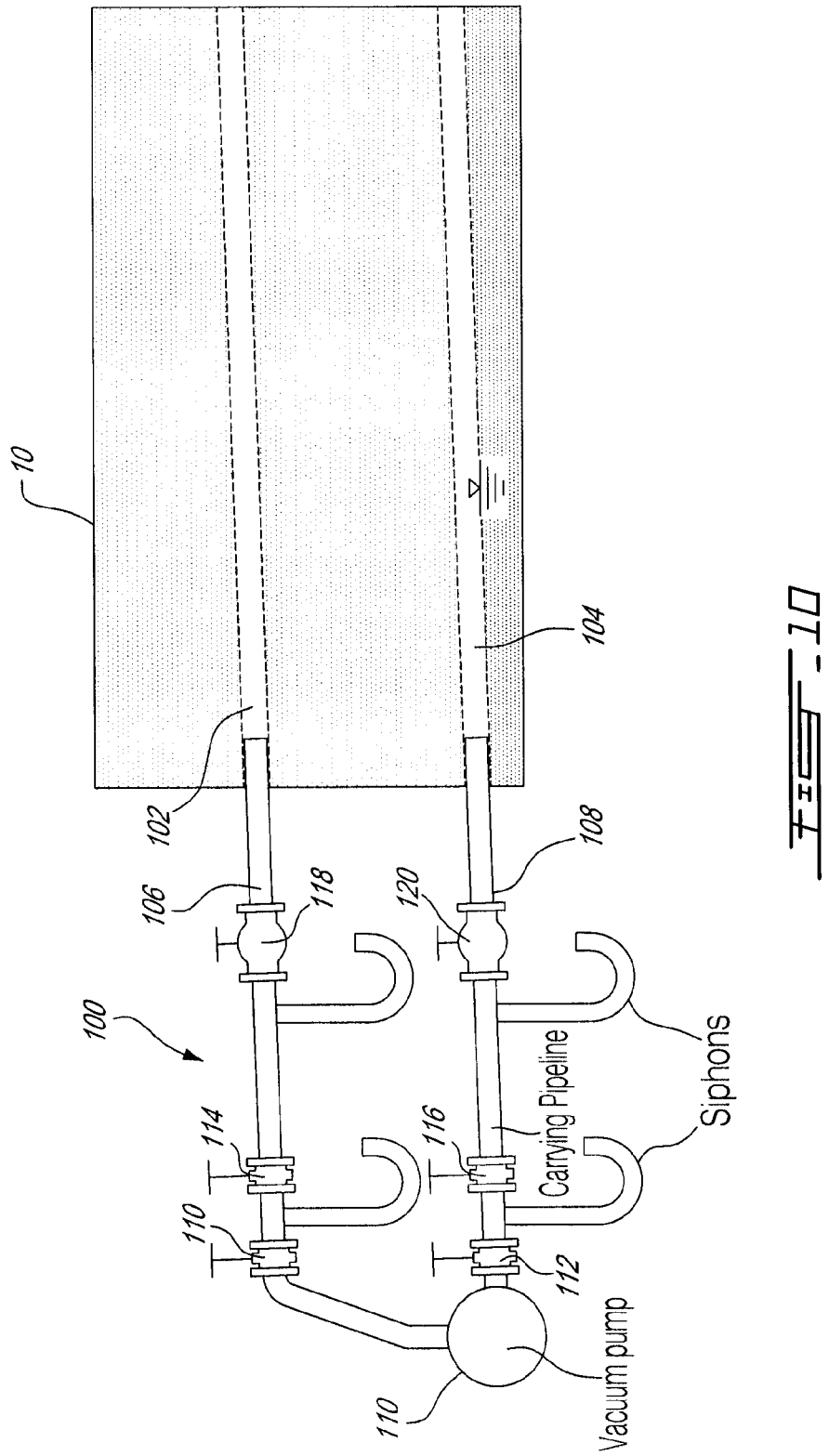
FIG. 10 is a side elevation view of a landfill provided with a gas extraction system according to a second illustrative embodiment.

Turning now to FIG. 10 of the appended drawings, a gas extraction system 100 according to a second illustrative embodiment will be described. It is to be noted that since the gas extraction system 100 is very similar to the gas extraction system 12 of FIG. 4, only the differences between these systems will be described hereinbelow, for concision purpose.

The gas extraction system 100 includes two vertically distanced and gently sloped perforated wells 102 and 104 respectively connected to a common vacuum pump 110 via pipelines 106 and 108 and via valves 110, 112, 114, 116, 118 and 120.

This arrangement allows the landfill 10 to be deeper while maintaining an efficient gas extraction. Of course, more than two vertically distanced and gently sloped perforated wells could be used.

Figure 11:
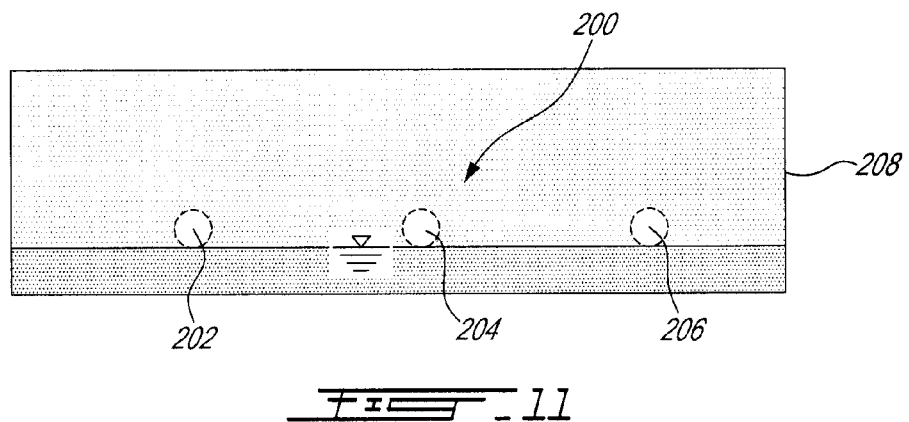
FIG. 11 is a front elevational view of a third illustrative embodiment.

Turning now to FIG. 11 of the appended drawings, a gas extraction system 200 according to a third illustrative embodiment will be described. It is to be noted that since the gas extraction system 200 is very similar to the gas extraction system 100 of FIG. 10, only the differences between these systems will be described hereinbelow.

The gas extraction system 200 includes three horizontally distanced perforated wells 202, 204 and 206 provided in the same landfill 208. The wells 202-206 are connected to the same vacuum pump (not shown) via pipelines, siphons and valves (also not shown). This arrangement allows the landfill 208 to be wider while maintaining an efficient gas extraction. Of course, more than three horizontally distanced perforated wells could be used. Similarly, more than one vacuum pump could be used.

Figure 12:
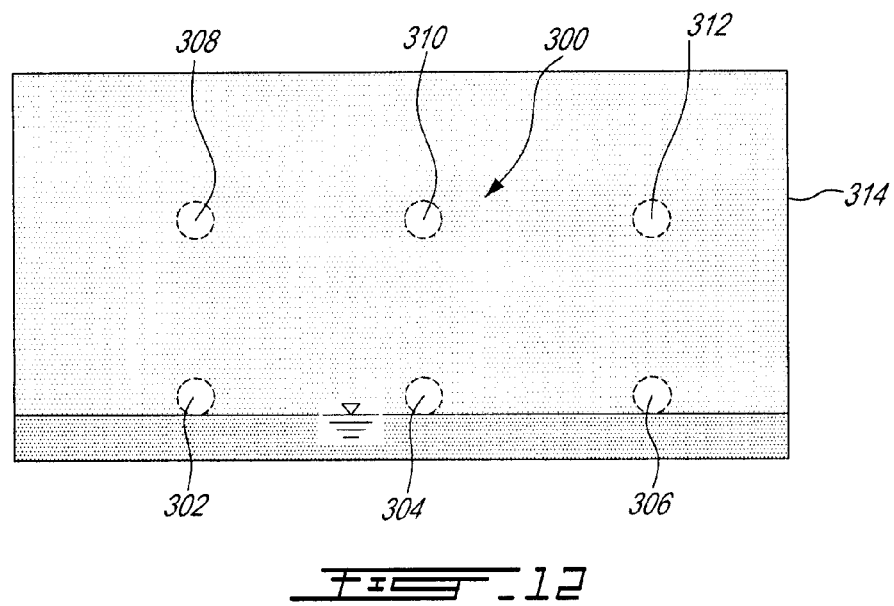
FIG. 12 is a front elevational view of a fourth illustrative embodiment.

Turning now to FIG. 12 of the appended drawings, a gas extraction system 300 according to a fourth illustrative embodiment will be described. Again, since the gas extraction system 300 is very similar to the gas extraction system 200 of FIG. 11, only the differences between these systems will be described hereinbelow.

The gas extraction system 300 includes a first row of three horizontally distanced perforated wells 302, 304 and 306 and a second row, vertically distanced from the first row, of three horizontally distanced perforated wells 308, 310 and 312, all provided in the same landfill 314. The wells 302-312 are connected to the same vacuum pump (not shown) via pipelines, siphons and valves (also not shown). This arrangement allows the landfill 314 to be both wider and deeper while maintaining an efficient gas extraction. Of course, more than three horizontally distanced perforated wells and more than two rows of wells could be used. Similarly, more than one vacuum pump could be used.

When multiple vertically separated gently sloping horizontal wells are installed as illustrated in FIGS. 10 and 12, it has been found interesting to vertically separate the wells of a distance not exceeding about 10 meters since this facilitates the installation of the horizontal well placed in a trench as the landfill is filled with biomass.

Similarly, when multiple horizontally separated gently sloping horizontal wells are installed as illustrated in FIGS. 11 and 12, it has been found interesting to horizontally separate the wells of a distance not exceeding about 30 meters.

It is to be noted that the vacuum pump 20 illustrated herein could be replaced by any adequate source of vacuum.

When multiple perforated wells are used in the same landfill or in adjacent landfills, a single vacuum pump can be connected thereto via a manifold.

It is to be noted that while all the multiple perforated well illustrative embodiments have the perforated well laid in the same direction, perforated wells laid in different directions could be advantageous in some landfill configurations.

Figure 13:
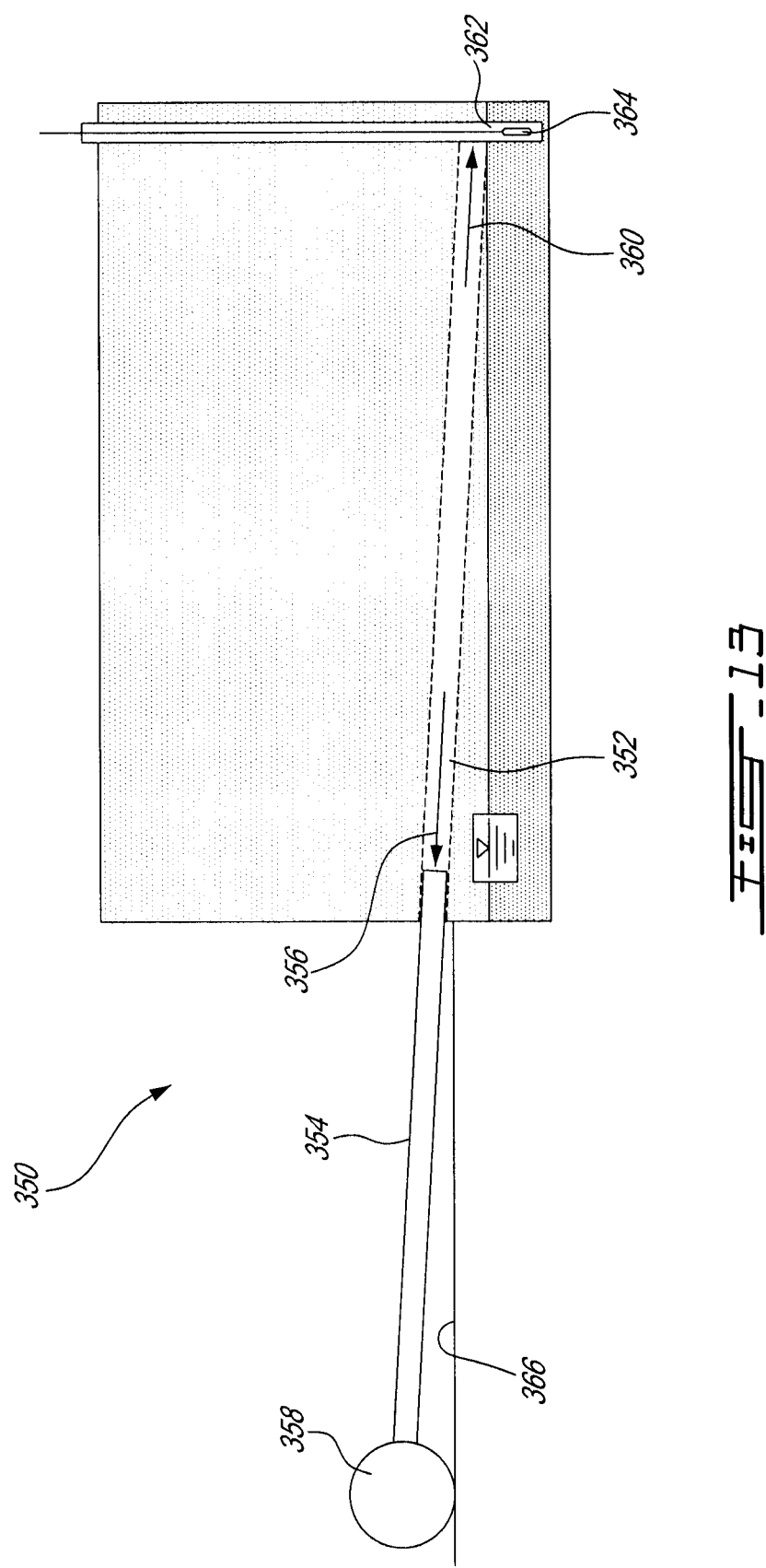
FIG. 13 is a side elevation view of a landfill provided with a gas extraction system according to a fifth illustrative embodiment.

Turning now to FIG. 13 of the appended drawings, a gas extraction system 350 according to a fifth illustrative embodiment will be described.

The system 350 includes a sloped perforated well 352, connected to a pipeline 354 that directs the gas in a first direction (see arrow 356) towards a vacuum pump 358. Because the perforated well 352 is sloped, the leachate is directed in a second, opposite, direction (see arrow 360) towards a sink hole 362. In other words, the leachate is discharged from the horizontal well 352 into the sink hole 362. A sump pump 364 is used to remove the leachate from the sink hole 362. It is to be noted that the sink hole 362 is hermetically closed to the atmosphere.

This configuration is interesting when the perforated well is provided under the natural soil level 366 and that the vacuum pump 358 is provided above the natural soil level 366.

Phase Implementation of Horizontal Wells

Figure 14:
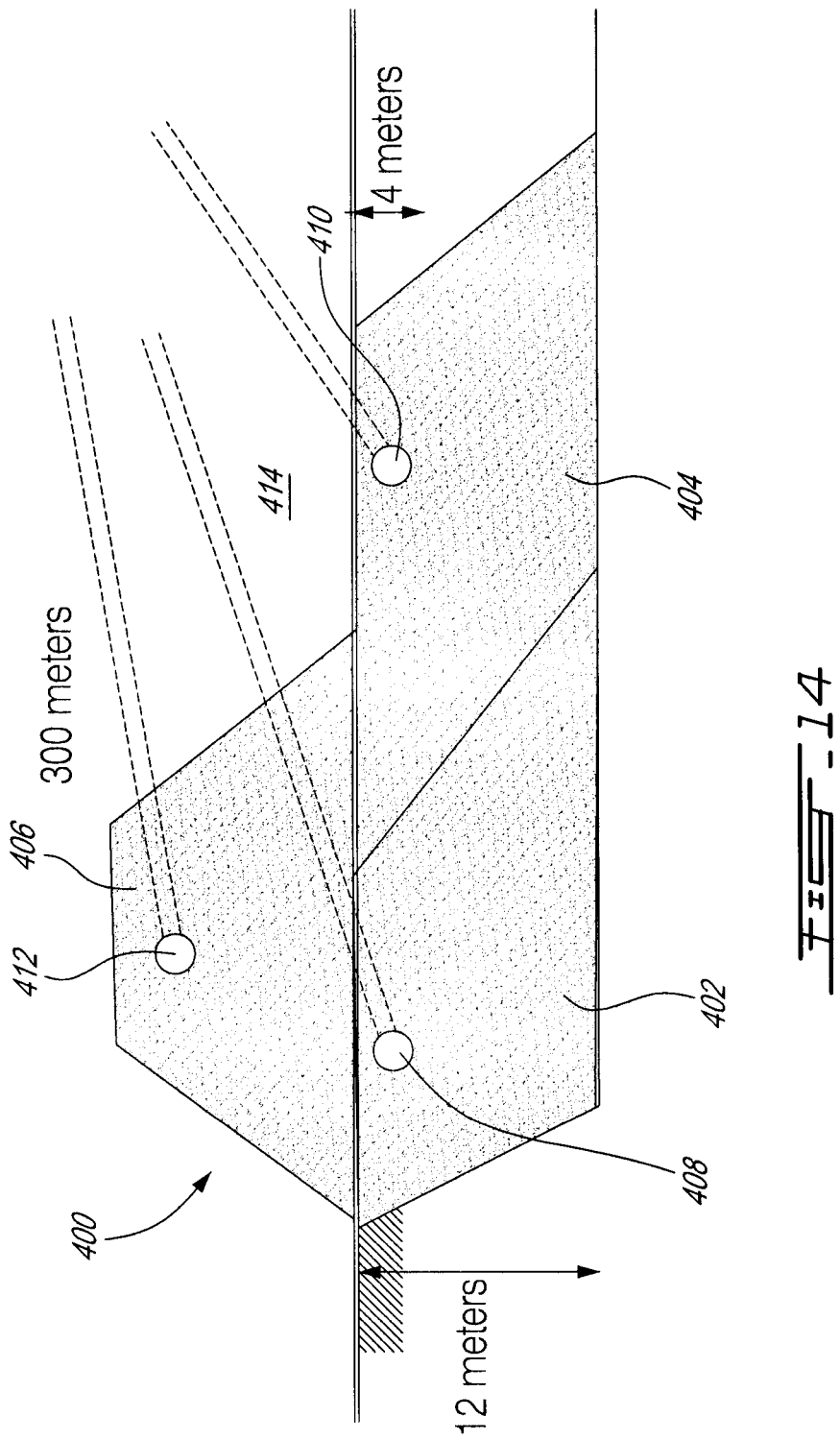
FIG. 14 is a front cross-sectional view of a first phase implementation of horizontal wells.
Figure 15:
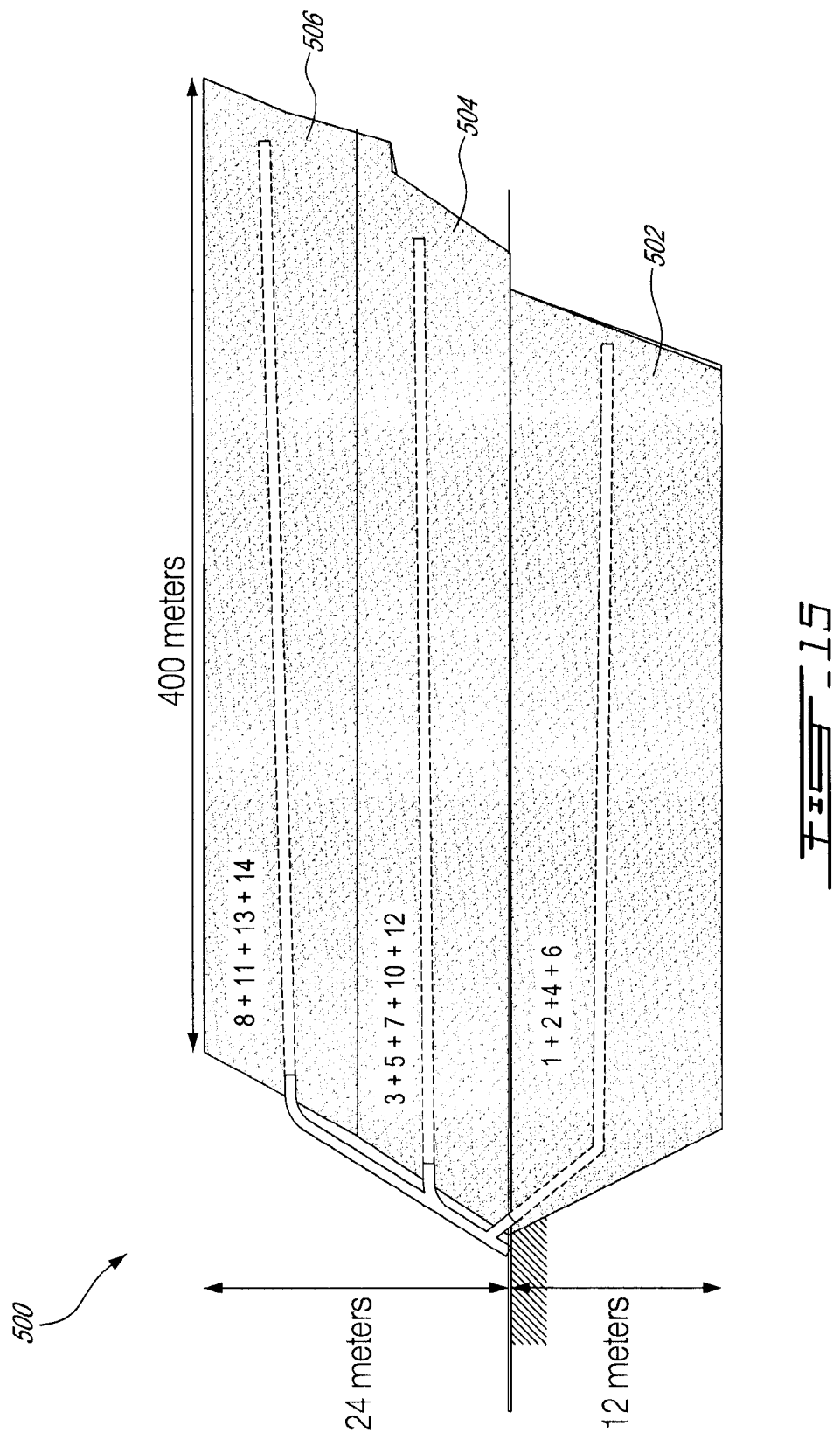
FIG. 15 is a side cross-sectional view of a second phase implementation of horizontal wells.
Figure 16:
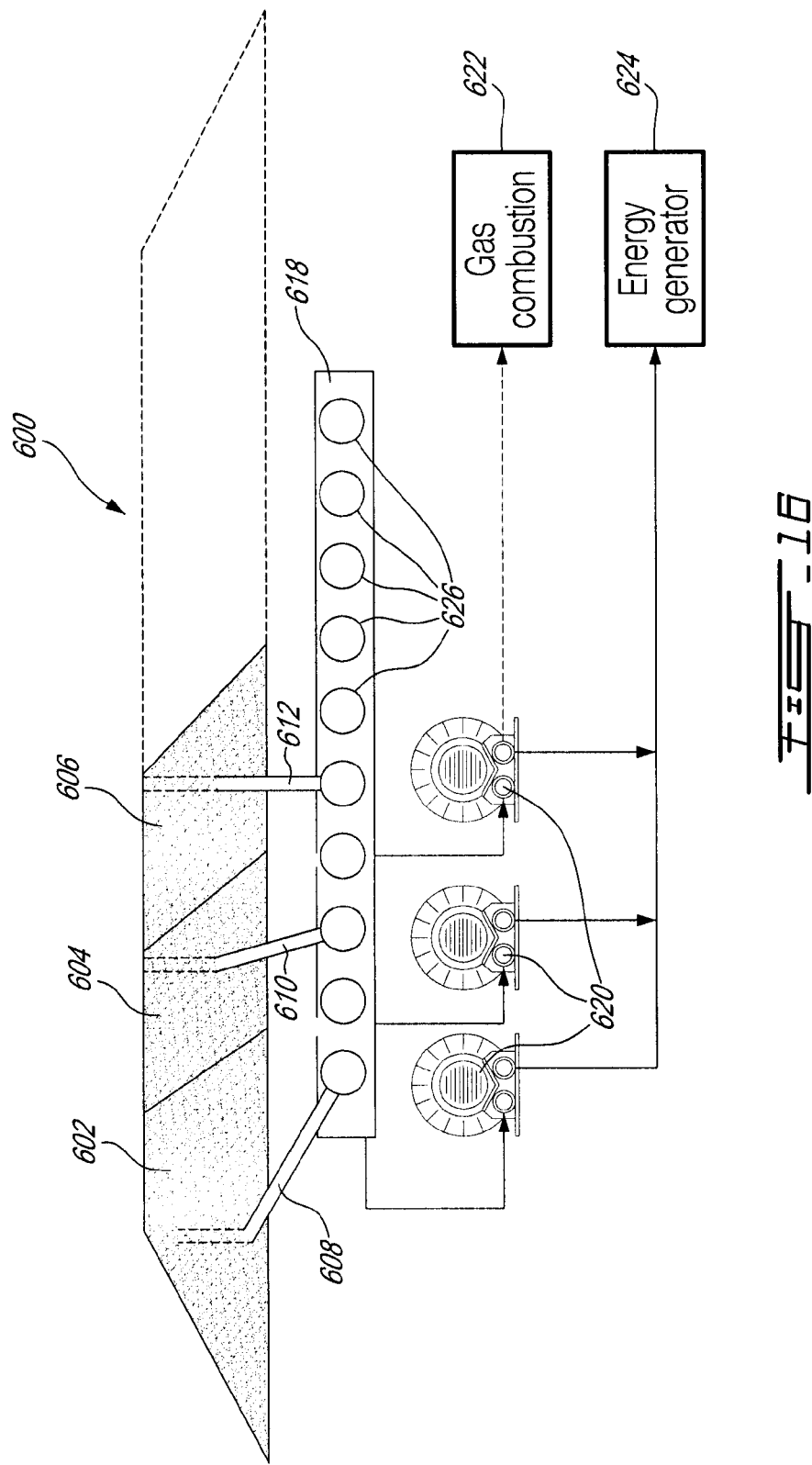
FIG. 16 is a front elevation view of a third phase implementation of horizontal wells.

Turning now to FIGS. 14 to 16 of the appended drawings the phase implementation of horizontal wells will be described.

As discussed hereinabove with reference to FIGS. 10 to 12, the size of landfills is generally such that more than one horizontal well are often required. However, the horizontal wells do not required to be installed at the same time and may be added as the biomass present in the landfill increases.

FIG. 14 illustrates, in a front cross-sectional view, a first phase implementation of horizontal wells provided in a landfill 400. Three phases 402, 404 and 406 are completed in the landfill 400. Phases 402 and 404 extend about 12 meters below ground while phase 406 extends about 12 meters above the ground. Each phase 402-406 includes a corresponding horizontal well 408, 410 and 412 similar to the perforated well 14 described hereinabove. Of course, as described hereinabove, pipelines, a liquid extraction mechanism, valves and a vacuum source (all not shown in FIG. 14) are also provided to extract the produced gas in phases 402-406.

The landfill 400 is ready to receive a third phase 414 provided adjacent to phases 404 and 406.

FIG. 15 illustrates, in a side cross-sectional view, a second phase implementation of horizontal wells provided in a fully filled landfill 500 including fourteen completed phases. Indeed, each layer 502-506 includes a number of side-by-side phases.

Each layer 502-506 is about 12 meters deep and about 400 meters long. Of course, layers can be more or less deep and more or less long than illustrated.

FIG. 16 illustrates a third phase implementation of horizontal wells provided in a landfill 600. Three side-by-side phases 602-606 are provided. These phases share 3 horizontal wells 608-612 all connected to a manifold 618 via pipelines, siphons and valves (not shown). The gas extracted by the vacuum pumps 620 is either supplied to a combustion system 622 or to an energy producing system 624.

Again, the landfill 600 is ready to receive other phases besides, below and above phase 606. Accordingly, the manifold 618 Includes supplemental inlets 626.

Control of the Individual Horizontal Wells to Optimize Gas Production

As mentioned hereinabove, it has been observed that the internal pressure profile will vary in the landfill following cycles of high and low positive pressure generating a pressure wave over time which has a varying amplitude and a varying frequency In order to optimize landfill gas production under these heterogeneous, anisotropic fluid conductivity characteristics and unsteady fluid flow conditions, commonly found in all landfills it has been found interesting to use a pressure feedback mechanism.

Figure 17:
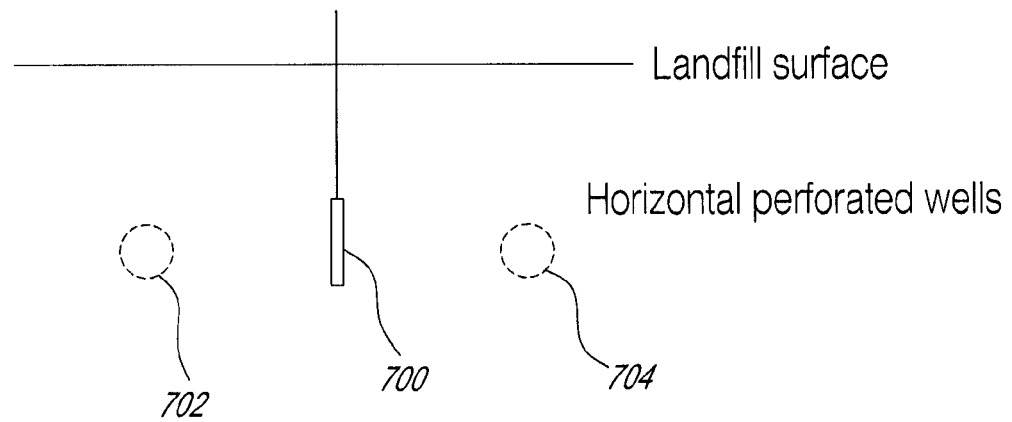
FIG. 17 is a schematic view illustrating a piezometer provided between adjacent horizontal wells.

The feedback mechanism includes pressure measuring devices, such as piezometers, installed between the landfill level and the well depth. For example, the pressure measuring devices can be installed substantially at the same level as the perforated well. The piezometers provide a feedback on the amplitude of internal pressure variation. FIG. 17 schematically illustrates a piezometer 700 provided between two horizontal wells 702 and 704.

The piezometers are used to fingerprint of the pressure variation amplitude and pressure wave length at a given point in the landfill, over time.

A plurality of piezometers is used to map the different landfill gas conditions prevailing in the landfill at rest, i.e. submitted to atmospheric pressure only.

The feedback mechanism also includes well heads equipped with a depression device, for example a vacuum pump, which creates a depression in the body of waste all along the perforated wells, as described hereinabove. These vacuum pumps create a new gradient and a new direction for the landfill produced gas to escape.

Figure 18:
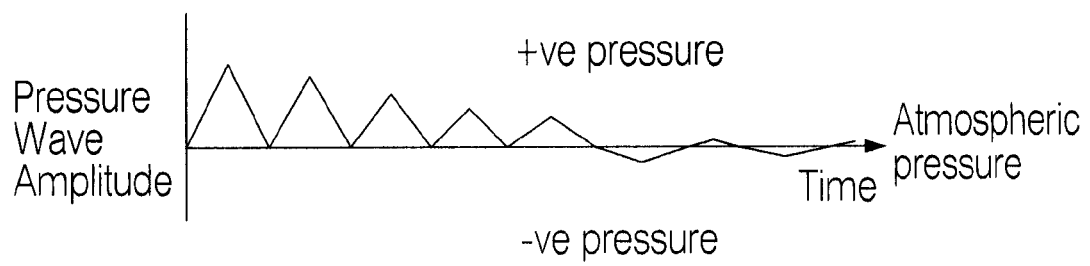
FIG. 18 is a schematic representation of the pressure wave amplitude and frequency over time when a vacuum is applied to a well.

The new depression conditions, caused by the vacuum pump, dampers the amplitude of the pressure wave over time and at a given point in space. When this is observed, a direct relationship can be made between landfill gas production and dampening of the pressure wave amplitude over time. FIG. 18 illustrates the pressure wave amplitude over time when vacuum is applied to the horizontal wells.

As can be seen from FIG. 18, it has been observed that the landfill submitted to the depression of the wells show negative pressure peaks measured at the pressure monitoring device It is to be noted that the head losses between the measured point and the well on which a depression is applied can be defined as the difference between the suction head in the well and the pressure (negative or positive) at the measured point at any given time minus the pressure at rest (or under no depression.

When the suction is done over a long period of time, the landfill gas may start showing depletion that could be due to a reduction of moisture content, a reduction of temperature, a preferential flow from the atmosphere and/or a reduction of organic waste to be decomposed.

Figure 19:
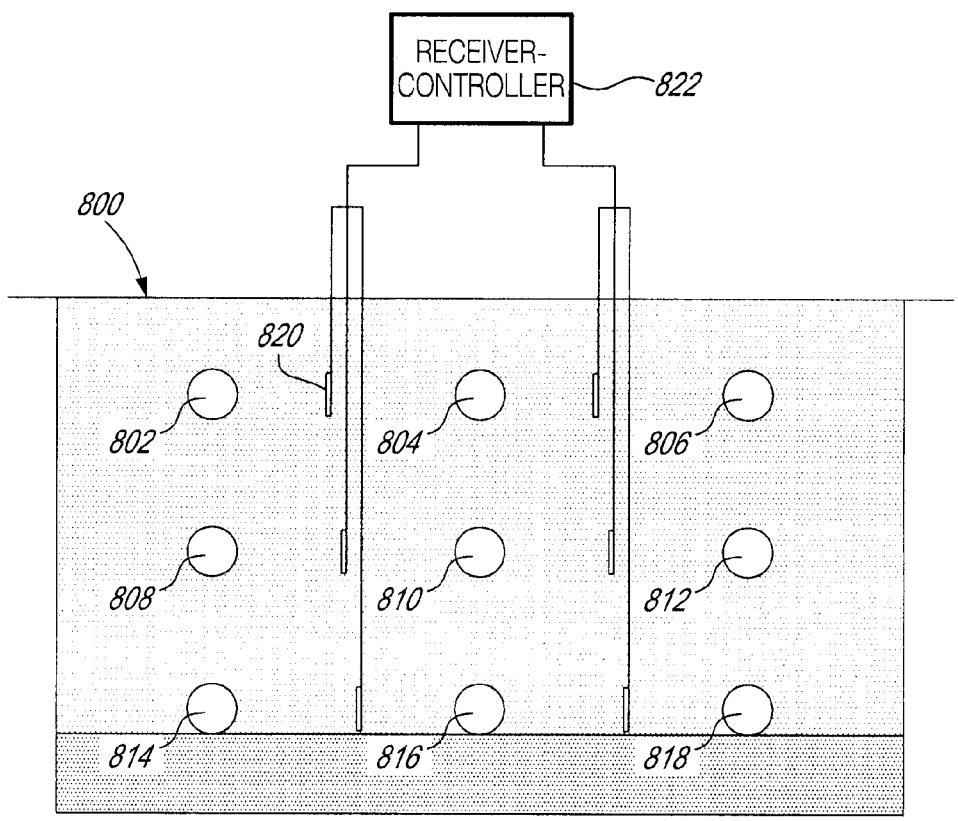
FIG. 19 schematically illustrates, in a cross-section view, a landfill provided with nine wells and six piezometers.

Turning now to FIG. 19 of the appended drawings a landfill 800 provided with nine perforated horizontal wells 802-818 and with six piezometers 820 will be described. As can be seen from this figure, the piezometers 820 are provided between adjacent wells provided on a same level and are connected to a common receiver-controller 822 receiving data therefrom. Each of the wells 802-818 is coupled to a vacuum source (not shown) via a corresponding actuating valve (not shown) that is so connected to the controller 806 as to be independently actuated.

Using the horizontal gas and liquid extraction wells 802-818 coupled to the piezometers 820, it is possible to understand the landfill behaviour even for these inherent anisotropic and heterogeneous conditions. The landfill behaviour can be mapped and can provide useful insights for the extraction of landfill gas despite the unsteadiness of its naturally occurring generation of landfill gas.

For example, the mapping can be achieved by submitting the landfill to different depression mode at each individual well 802-818 since each well is equipped with a separate actuating valve.

Each separate valve can be closed, partially open of totally open, hence affecting the depression and consequently the landfill gas extraction flow regime and state.

By sequencing the opening and the closing of each valve according to a predetermined pattern, it is possible to measure the effect of the depression from different well individually or combined together on each individual pressure measuring device. This enables the receiver-controller 822 to determine how to activate the valves in view of increasing the gas extraction from the biomass.

It is possible to open all or some valve according to different predetermined patterns of actuation of the valves, hereinafter referred to as "modes". For example, three modes are described hereinbelow.

MODE A: All the Wells are Under Depression

Figure 20:
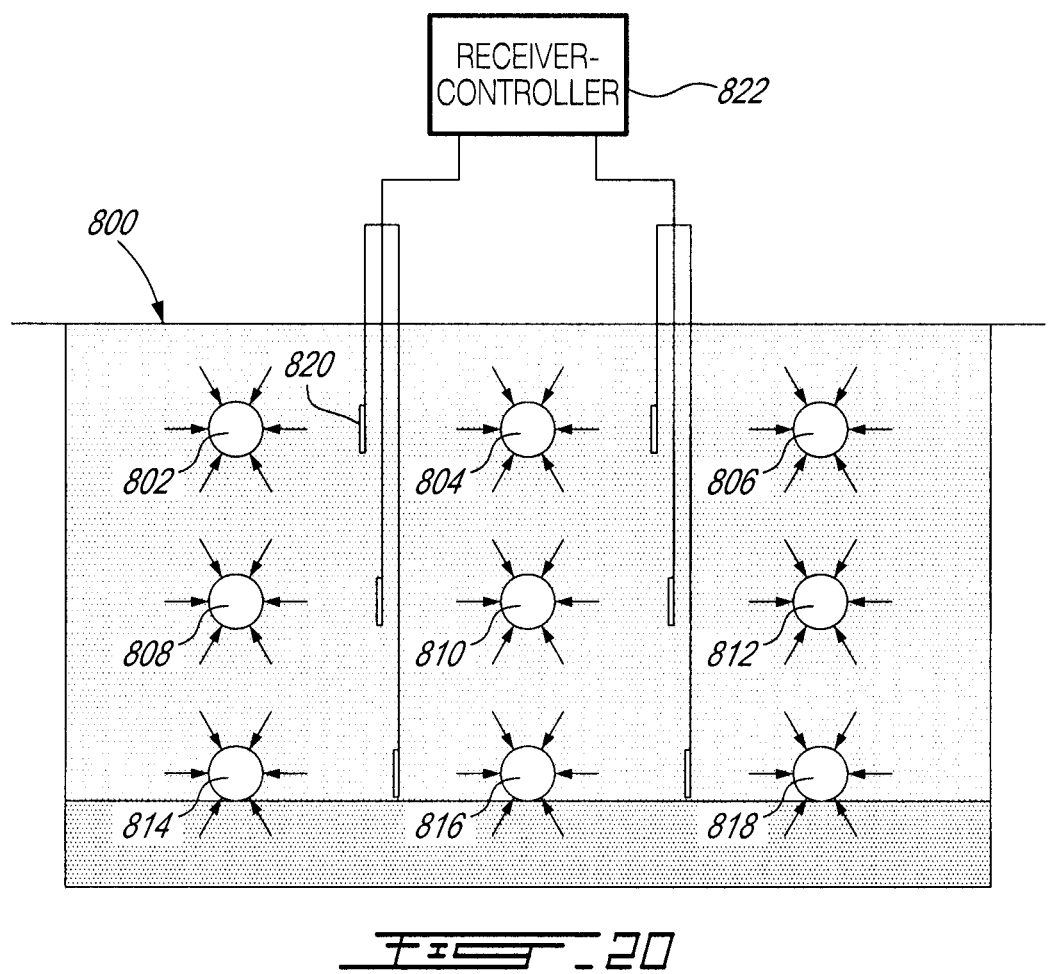
FIG. 20 is similar to FIG. 18 and illustrates a mode where a vacuum is applied to all the wells.

This mode is illustrated in FIG. 20. All the valves of the wells 802-818 are fully or partly opened in negative pressure. The flow rate of the produced gas is adjusted according to CH4 & O2 concentration. The arrows in FIG. 20 illustrate the produced gas flow towards the wells.

MODE B: Alternate Wells Under Vacuum

Figure 21:
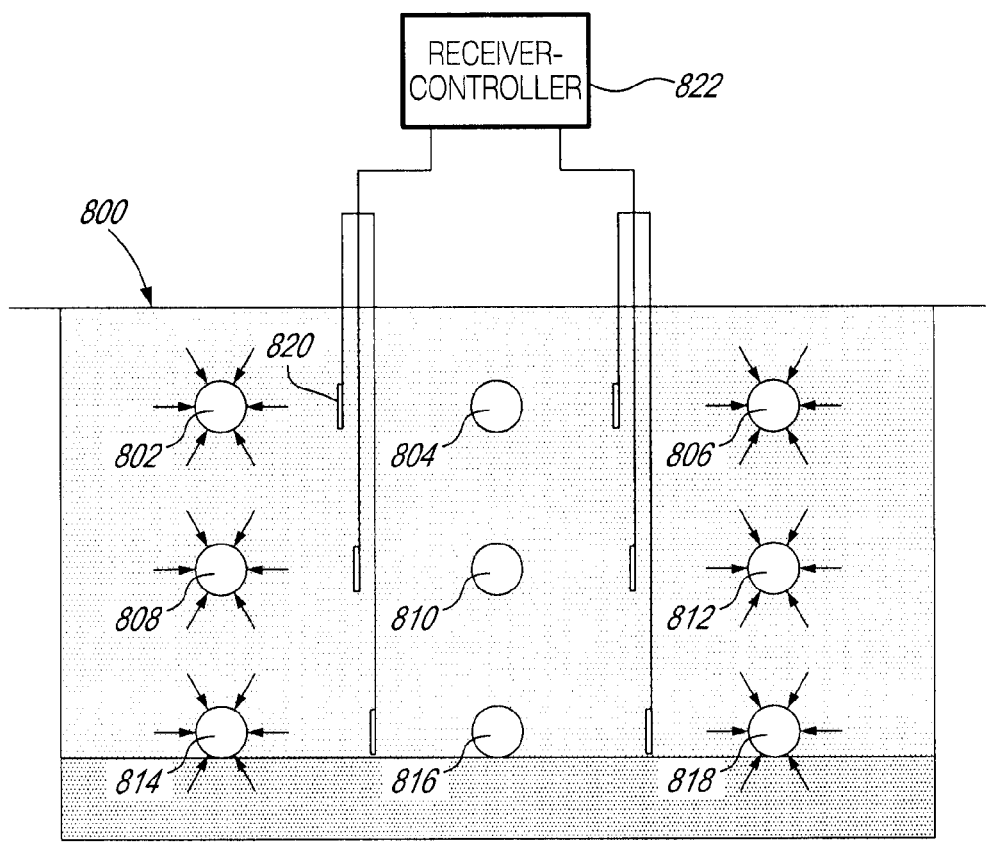
FIG. 21 is similar to FIG. 18 and illustrates a mode where a vacuum is applied to six of the nine wells.

In this mode, two distinct steps are performed. In a first step, illustrated in FIG. 21, the receiver-controller 822 controls the valves so that wells 802, 806, 808, 812, 814 and 818 are under negative pressure.

Figure 22:
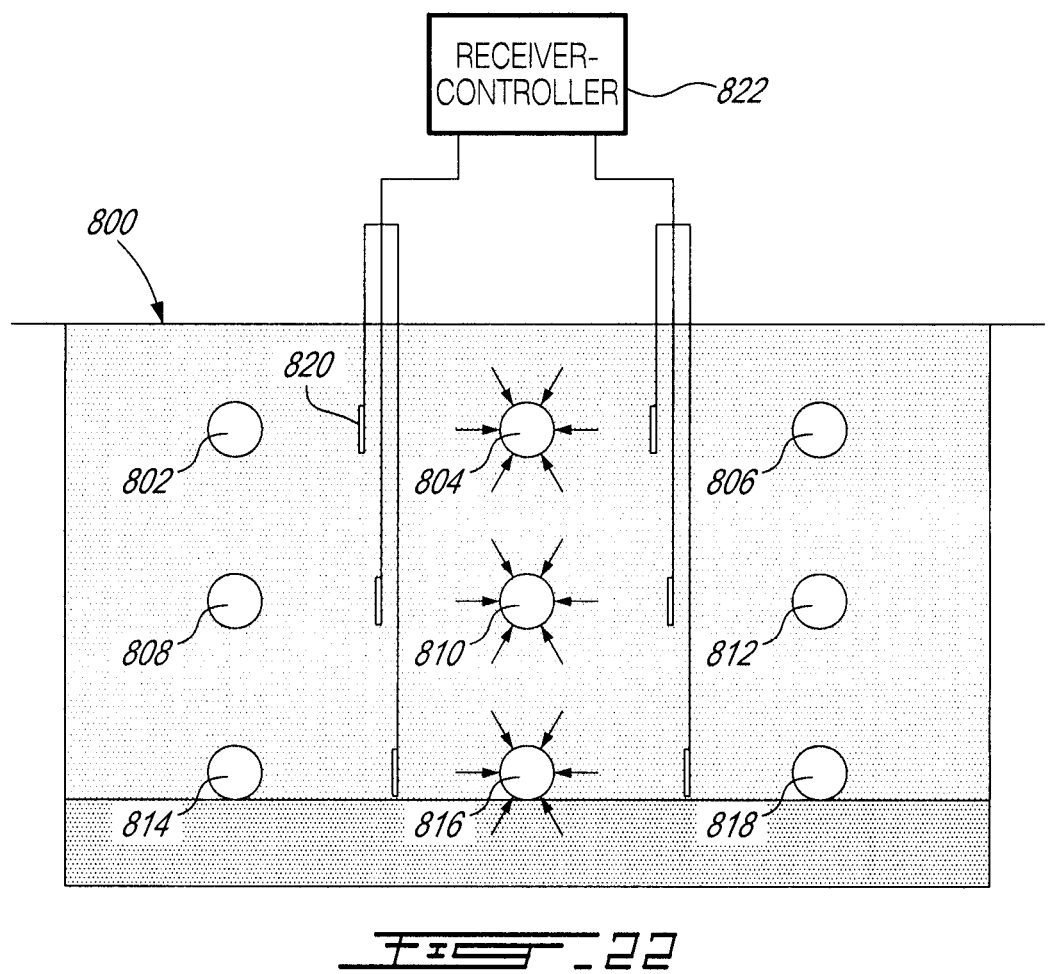
FIG. 22 is similar to FIG. 18 and illustrates a mode where a vacuum is applied to three of the nine wells.

In the second step, illustrated in FIG. 22, the receiver-controller 822 controls the valves so that wells 804, 810 and 816 are under negative pressure.

MODE C: Staggered Wells Under Vacuum

Figure 23:
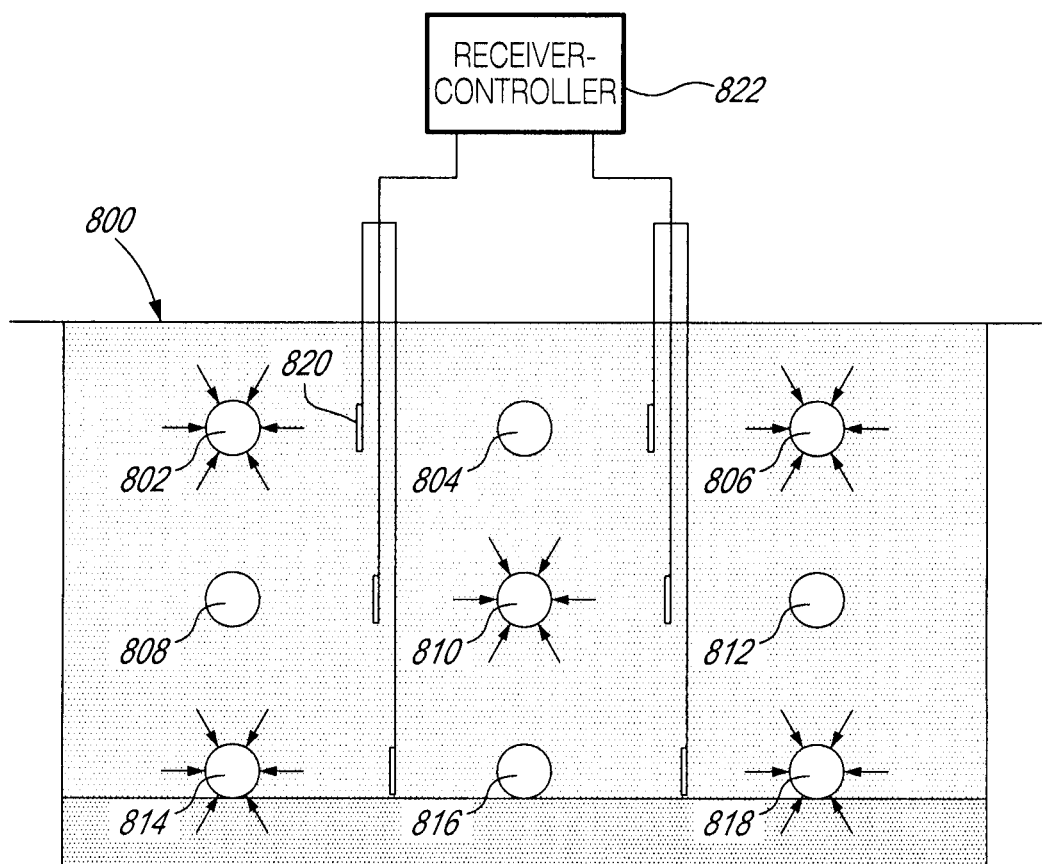
FIG. 23 is similar to FIG. 18 and illustrates a mode where a vacuum is applied to five of the nine wells, in a staggered configuration.

Again, in this mode, two distinct steps are performed. In a first step, illustrated in FIG. 23, the receiver-controller 822 controls the valves so that wells 802, 806, 810, 814 and 818 are under negative pressure.

Figure 24:
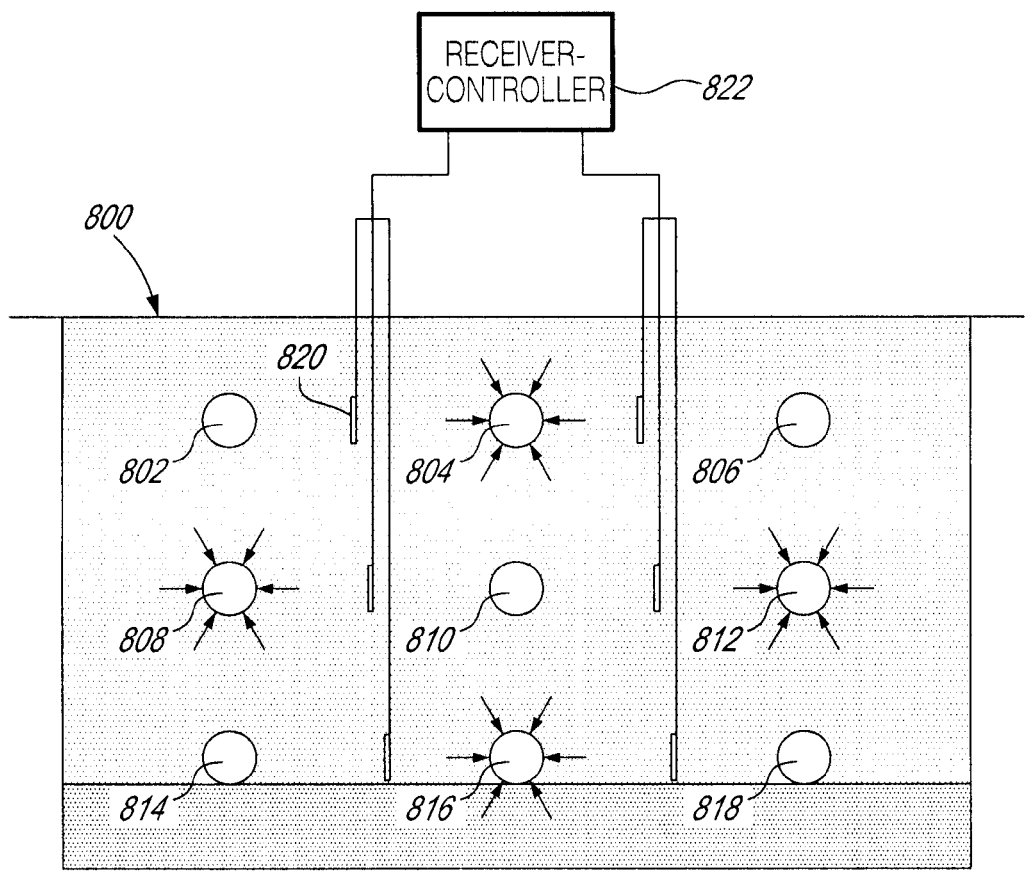
FIG. 24 is similar to FIG. 18 and illustrates a mode where a vacuum is applied to four of the nine wells, in a staggered configuration.

In the second step, illustrated in FIG. 24, the receiver-controller 822 controls the valves so that wells 804, 808, 812 and 816 are under negative pressure.

By going through the three modes described hereinabove, it is possible to determine the efficiency of landfill gas extraction for individual wells. It is even possible to determine the pumping rate strategy due to well that might become blocked over time.

By varying the mode of depression in the landfill body it is possible to induce a movement, as shown by the arrows in FIGS. 20-24, of leachate within the organic matter of the landfill which then distributes more evenly the moisture content among organic matter. By having a more even distribution of moisture within the organic matter, more organic matter is allowed to decompose which then increase the production of landfill gas over a given period for the same quantity of organic matter.

By applying a depression on a given well, the pressure wave amplitude is dampened over time and under the depression conditions of the well as measured by the piezometer. By applying a depression to opposite wells, it is expected that the same piezometer will be showing a different dampening of the pressure wave amplitude. The wells positioned above and below the horizontal wells will also, under depression, exercise a different dampening effect on the pressure wave as measured by the piezometer.

The decision process is made simpler and more thorough, by having a proper mapping for a given point in time and over time combined with the other measuring points in time and over time of the unsteadiness of landfill gas flow rate due to the landfill anisotropy and heterogeneity.

For example, should one of the piezometer 820 detect an increase in landfill pressure amplitude, while suction is applied to the neighbouring well; the valves of the neighbouring horizontal wells can be open further to relieve the excess pressure.

To the opposite, should one of the piezometer 820 detect an increase in landfill depression amplitude (below 0), while suction is applied to the neighbouring well to a point where oxygen is introduced from the atmosphere; the valves of the neighbouring horizontal wells can be reduced further to prevent the excess depression.

Should a piezometer 820 detect no depletion of the pressure amplitude while depression is applied to neighboring well, it could mean that the vacuum applied from the well has no impact on the landfill at the measuring point; in this case either the well is blocked or is too far from the measuring point to influence pressure variation over time.

In the latter case, a depression created by the opposite neighboring well may cause a different reading on the same piezometer over time meaning a different flow condition from the other direction Should a piezometer 820 detects a very high depression which approaches the depression level applied to neighboring well; this could be a consequence of a very low flow occurring between the neighboring well and the monitoring point (i.e. suction built-up) even though the neighboring well has an impact on the piezometer reading.

In this case, a depression created by the opposite neighboring well may cause a different reading on the same piezometer over time, which could mean a different flow condition from the other direction.

In all situations of the above examples, the operator obtains a better understanding of the landfill characteristics and is able to plan accordingly to maximize landfill gas capture.

It is to be noted that while pressure variation can be measured by the pressure measuring device 700 over time, other varying biological, electrical, optic, mechanical, chemical parameters of concern such as Temperature ° C.; electrical current Mvolts; respiratory rate $O_2/CO_2$; metabolic rate $CH_4$, for example, can be measured by other measuring devices (not shown) positioned near the piezometer 700. Variation over time which could create consequent wave formation for a given parameter, i.e. temperature wave; Mvolt wave; $O_2/CO_2/CH_4$ wave and so on can also be recorded.

It is to be noted that while only one piezometer 820 is illustrated between adjacent wells in the appended figures, more than one piezometer may be installed along the entire length of the wells. For example, three piezometers can be installed alongside each well.

As mentioned herein, landfill gas generation relies on the presence of organic matter decomposed under anaerobic condition with given temperature and moisture. Excess moisture under saturated conditions will impede the generation of landfill gas. Absence of moisture will also impede the production of landfill gas.

Accordingly, once the leachate water is extracted with the horizontal wells described herein, the landfill gas generation is accelerated until the moment when the moisture content of the biomass is depleted.

It has been shown that leachate water recirculation can maintain ideal moisture conditions to compensate the gradual depletion of landfill gas production.

One potential way to recirculate leachate in a system comprising a plurality of horizontal wells described herein would be to re-introduce the leachate at the upstream end of wells that are not under vacuum. For example, the free open end 30 of the siphon 18 (FIG. 5) could be connected to an irrigation line (not shown) that would carry the leachate to the upstream end of adequate wells. If a sink hole 356 is used (FIG. 13) the outlet of the sump pump 358 could bring the leachate to the upstream end of adequate wells.

Figure 25:
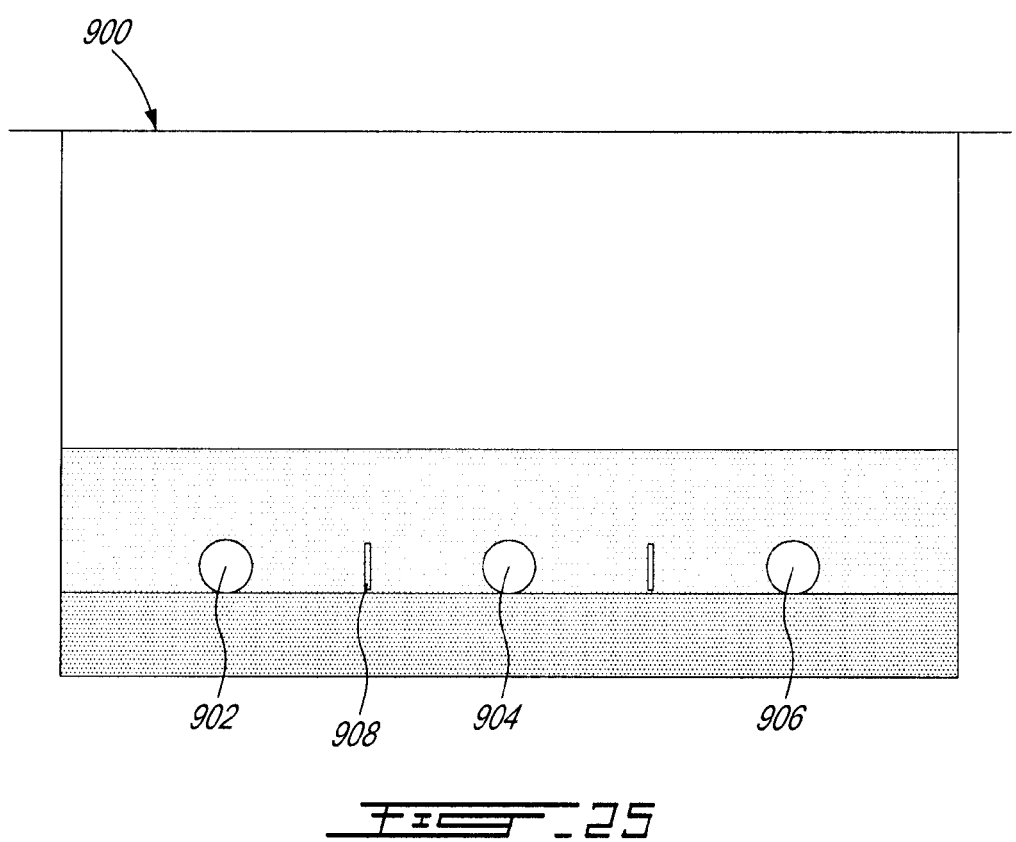
FIG. 25 schematically illustrates, in a cross-section view, a landfill provided with a first row of wells.
Figure 26:
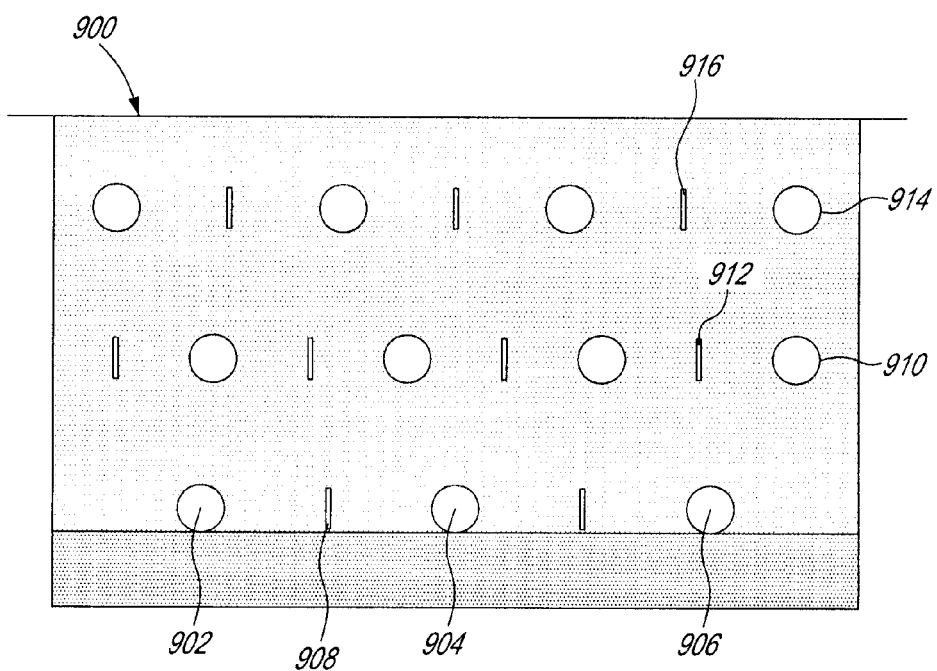
FIG. 26 schematically illustrates, in a cross-section view, a landfill provided with three rows of wells.

Turning now to FIGS. 25-27 of the appended drawings, another technique to optimize the gas production in a landfill will be described.

This technique aims at determining the proximity and position of the perforated horizontal wells.

In FIG. 25, a first row of three horizontal wells 902, 904 and 906 is laid in a partially filled landfill 900. Piezometers 908 are provided between the wells.

The operator may thus monitor the pressure wave detected by the piezometers 908, and therefore understand the particulars of the landfill 900 regarding the gas collection efficiency to take decisions regarding the later installation of supplemental wells.

FIG. 26 shows the landfill 900 when second and third rows of horizontal perforated wells 910 and 914, including respective piezometers 912 and 916, are installed. In the example of FIG. 26, each row 910 and 914 includes four wells and the density of wells above the wells 902-906 is increased since the amount of gas generated is higher than the gas collected by wells 902-906 as shown by piezometers 908 reading and pressure wave variation over time.

FIG. 27 illustrates an alternate configuration of the second and third rows 910' and 914'. In this configuration, the wells are staggered and equidistant.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention.

What is claimed is:

1. A gas and liquid extraction system to be installed in a landfill to extract gas and liquid from a biomass present in the landfill; the gas and liquid extraction system comprising:
   A perforated well configured to allow gas and liquid through a surface of the perforated well and so positioned in the biomass as to have a downward slope of about 2 degrees; the perforated well including a generally cylindrical tube provided with perforations and having a diameter of about ten inches;
   A sloping pipeline connected to the perforated well and having a downward slope; the sloping pipeline including a liquid extraction mechanism to extract liquid from the sloping pipeline; the liquid extraction mechanism including:
      A leachate and gas valve provided on the sloping pipeline, downstream of the biomass,
      A first generally J-shaped siphon so connected to the sloping pipeline, downstream of the leachate and gas valve, as to discharge liquid by gravity;
      A manifold gas valve provided on the sloping pipeline, downstream of the first J-shaped siphon;
      A second generally J-shaped siphon so connected to the sloping pipeline, downstream of the manifold gas valve, as to discharge liquid by gravity;
      A main valve provided on the sloping pipeline downstream of the second J-shaped siphon; and
      A vacuum source including a vacuum pump and connected to the sloping pipeline downstream of the main valve;
   Wherein the main valve and the manifold gas valve are operative to open to allow the vacuum source to selectively apply a vacuum to the sloping pipeline and to the perforated well in order to extract gas from the sloping pipeline and to close once a depression is created in the perforated well;
   Wherein the leachate and gas valve is operative to gradually open when the depression is created in order to prime the sloping pipeline and to regulate a flow of the gas into the sloping pipeline while allowing the liquid to discharge via the first J-shaped siphon; and
   Wherein excess liquid not discharged via the first J-shaped siphon is discharged via the second J-shaped siphon upon opening of the manifold gas valve.

2. The gas and liquid extraction system as recited in claim 1, wherein the liquid extraction mechanism includes a sink hole in which the sloping pipeline discharges liquid.

3. The gas and liquid extraction system as recited in claim 2, wherein the sink hole includes a sump pump.

4. The gas and liquid extraction system as recited in claim 1, further comprising means for transferring liquid from the liquid extraction mechanism back to a vicinity the perforated well.

5. The gas and liquid extraction system as recited in claim 1, wherein the generally cylindrical tube is surrounded by porous drainable material to increase a nominal diameter of the generally cylindrical tube.

6. The gas and liquid extraction system as recited in claim 1, wherein the vacuum source is operable to raise a level of liquid in a straight portion of the first J-shaped siphon, whereby liquid is discharged by gravity from an open end of the first J-shaped siphon.

7. A gas and liquid extraction system to be installed in a landfill to extract gas and liquid from a biomass present in the landfill; the gas and liquid extraction system comprising:
   A plurality of perforated wells configured to allow gas and liquid through a surface in each perforated well of the plurality of perforated wells and so positioned in the biomass as to have a downward slope of about 2 degrees; each perforated well including a generally cylindrical tube provided with perforations and having a diameter of about ten inches;
   A vacuum source including a vacuum pump;
   A pipeline system having a plurality of sloping pipelines, each sloping pipeline interconnecting a corresponding perforated well to the vacuum source; via each sloping pipeline having a downward slope; the pipeline system including a liquid extraction mechanism to extract liquid from the sloping pipelines; the liquid extraction mechanism including, on each sloping pipeline:
      A leachate and gas valve provided on the sloping pipeline, downstream of the biomass;
      A first generally J-shaped siphon so connected to the sloping pipeline, downstream of the leachate and gas valve, as to discharge liquid by gravity;
      A manifold gas valve provided on the sloping pipeline, downstream of the first J-shaped siphon;
      A second generally J-shaped siphon so connected to the sloping pipeline, downstream of the manifold gas valve, as to discharge liquid by gravity;
      A main valve provided on the sloping pipeline downstream of the second J-shaped siphon and upstream of the vacuum source;
   At least one sensing device provided in a vicinity of at least one perforated well of the plurality of wells;
   A receiver-controller so configured as to control actuation of the leachate and gas valves, of the manifold valves and of the main valves and to receive data from the at least one sensing device;
   Wherein the receiver-controller determines the actuation of the leachate and gas valves, of the manifold gas valves, and of the main valves depending on the data received from the at least one sensing device so that, for each sloping pipeline and for each corresponding perforated well:
      The main valve and the manifold gas valve of the sloping pipeline are operative to open to allow the vacuum source to selectively apply a vacuum to the sloping pipeline and to the perforated well in order to extract gas from the sloping pipeline and to close once a depression is created in the perforated well;
      The leachate and gas valve is operative to gradually open when the depression is created in order to prime the sloping pipeline and to regulate a flow of the gas into the sloping pipeline while allowing the liquid to discharge via the first J-shaped siphon; and
      Excess liquid not discharged via the first J-shaped siphon of the sloping pipeline is discharged via the second J-shaped siphon upon opening of the manifold gas valve.

8. The gas and liquid extraction system as recited in claim 7, wherein the plurality of perforated wells are adjacent to one another and wherein the at least one sensing device includes a plurality of piezometers provided between adjacent perforated wells.

9. The gas and liquid extraction method as recited in claim 7, wherein the receiver-controller is so configured as to control the actuation of the leachate and gas valves, of the manifold gas valves, and of the main valves according to a predetermined pattern and to receive corresponding data from the at least one sensing device in view of determining actuation of the leachate and gas valves, of the manifold gas valves, and of the main valves provided on each of the plurality of sloping pipelines to increase gas extraction from the biomass.

10. The gas and liquid extraction system as recited in claim 7, wherein each of the generally cylindrical tubes is surrounded by porous drainable material to increase a nominal diameter of each of the generally cylindrical tubes.

11. A gas and liquid extraction method to extract gas and liquid from a biomass provided in a landfill; the extraction method comprising:
   Installing a perforated well configured to allow gas and liquid through a surface of the perforated well and on an upper part of a first biomass layer; the perforated well including a generally cylindrical tube provided with perforations and having a diameter of about ten inches and being so installed as to have a downward slope of about 2 degrees;
   Providing a second biomass layer on top of the first biomass layer;
   Connecting the perforated well to a vacuum source via a sloping pipeline having a downward slope and including a liquid extraction mechanism; the liquid extraction mechanism including:
      A leachate and gas valve provided on the sloping pipeline, downstream of the first and second biomass layers;
      A first generally J-shaped siphon connected to the sloping pipeline, downstream of the leachate and gas valve;
      A manifold gas valve provided on the sloping pipeline, downstream of the first J-shaped siphon;
      A second generally J-shaped siphon connected to the sloping pipeline, downstream of the manifold gas valve; and
      A main valve provided on the sloping pipeline, downstream of the second J-shaped siphon;
   Opening the main valve and the manifold gas valve to allow a vacuum pump connected to the sloping pipeline downstream of the main valve to selectively apply a vacuum to the sloping pipeline and to the perforated well in order to create a depression in the perforated well to extract gas from at least one of the first and second biomass layers;
   Closing the main valve and the manifold valve once the depression is created;
   Gradually opening the leachate and gas valve when the depression is created in order to prime the sloping pipeline and to regulate a flow of the gas into the sloping pipeline and to allow liquid to discharge by gravity from the sloping pipeline via the first J-shaped siphon; and
   Opening the manifold gas valve to allow liquid not discharged via the first J-shaped siphon to discharge by gravity via the second J-shaped siphon.

12. The gas and liquid extraction method as recited in claim 11, wherein the liquid extraction from the sloping pipeline is done by the liquid extraction mechanism including a sink hole.

13. The gas and liquid extraction method as recited in claim 11, further comprising transferring the extracted liquid back to a vicinity of the perforated well.

14. The gas and liquid extraction method as recited in claim 11, further comprising:
   providing porous drainable material surrounding the generally cylindrical tube in order to increase a nominal diameter of the generally cylindrical tube.

* * * * *